US012109810B2

(12) United States Patent
Hiwada

(10) Patent No.: US 12,109,810 B2
(45) Date of Patent: Oct. 8, 2024

(54) HEAD, PRINTING APPARATUS, AND HEAD CONTROLLER

(71) Applicant: Brother Kogyo Kabushiki Kaisha, Nagoya (JP)

(72) Inventor: Shuhei Hiwada, Toyoake (JP)

(73) Assignee: Brother Kogyo Kabushiki Kaisha, Nagoya (JP)

( * ) Notice: Subject to any disclaimer, the term of this patent is extended or adjusted under 35 U.S.C. 154(b) by 93 days.

(21) Appl. No.: 17/693,614

(22) Filed: Mar. 14, 2022

(65) Prior Publication Data

US 2022/0314617 A1 Oct. 6, 2022

(30) Foreign Application Priority Data

Mar. 30, 2021 (JP) ................................ 2021-058224
Sep. 3, 2021 (JP) ................................ 2021-143754

(51) Int. Cl.
*B41J 2/045* (2006.01)
*B41J 2/14* (2006.01)

(52) U.S. Cl.
CPC ....... *B41J 2/04588* (2013.01); *B41J 2/04536* (2013.01); *B41J 2/04581* (2013.01); *B41J 2/14201* (2013.01)

(58) Field of Classification Search
CPC ......................... B41J 2/04588; B41J 2/04536; B41J 2/04581; B41J 2/14201
See application file for complete search history.

(56) References Cited

U.S. PATENT DOCUMENTS

2007/0146403 A1* 6/2007 Sayama ............... B41J 2/04588 347/10
2007/0177169 A1 8/2007 Han
(Continued)

FOREIGN PATENT DOCUMENTS

JP S58-88469 U 6/1983
JP 2001-054947 A 2/2001
(Continued)

OTHER PUBLICATIONS

Mar. 14, 2022—Co-pending U.S. Appl. No. 17/693,677.
(Continued)

*Primary Examiner* — Thinh H Nguyen
(74) *Attorney, Agent, or Firm* — Banner & Witcoff, Ltd.

(57) ABSTRACT

There is provided head including: nozzle configured to discharge liquid by energy generating element; signal generator configured to generate, based on first and second data representing first and second driving waveform, time division multiplex signal including first and second portions of the first driving waveform, and third and fourth portions of the second driving waveform; and separator configured to separate first or second driving waveform signal representing the first or second driving waveform from the time division multiplex signal. The energy generating element is configured to be driven by the first or second driving waveform signal. In the time division multiplex signal, the third portion is aligned between the first and second portions and the second portion is aligned between the third and fourth portions. The time division multiplex signal is capable of transmitting the first and second data via single signal line.

17 Claims, 14 Drawing Sheets

(56) References Cited

U.S. PATENT DOCUMENTS

| | | | | |
|---|---|---|---|---|
| 2008/0024535 | A1 * | 1/2008 | Ito | B41J 2/04518 347/11 |
| 2008/0122888 | A1 | 5/2008 | Suzuki | |
| 2013/0083106 | A1 | 4/2013 | Tsukamoto | |
| 2013/0182025 | A1 | 7/2013 | Yanaka | |
| 2017/0113461 | A1 | 4/2017 | Netsu et al. | |
| 2018/0201012 | A1 | 7/2018 | Miyagishi | |
| 2018/0272705 | A1 | 9/2018 | Ono et al. | |
| 2019/0126611 | A1 | 5/2019 | Lahiri et al. | |
| 2021/0060935 | A1 | 3/2021 | Kashimura et al. | |
| 2022/0314617 | A1 | 10/2022 | Hiwada | |

FOREIGN PATENT DOCUMENTS

| | | | |
|---|---|---|---|
| JP | 2008-126612 | A | 6/2008 |
| JP | 2010-064465 | A | 3/2010 |
| JP | 2010-142978 | A | 7/2010 |
| JP | 2011-20330 | A | 2/2011 |
| JP | 2017-80891 | A | 5/2017 |
| JP | 2017-113965 | A | 6/2017 |
| JP | 2019-512413 | A | 5/2019 |

OTHER PUBLICATIONS

Jul. 22, 2022—(EP) Extended EP Search Report—EP App. 22155761.4.

Jan. 9, 2024—(JP) Notice of Reasons for Refusal—JP App 2021-143754, Eng Tran.

Mar. 14, 2024—(US) Office Action—U.S. Appl. No. 17/822,180.

Jan. 9, 2024—(JP) Notice of Reasons for Refusal—JP App 2021-161820, Eng Tran.

Jun. 25, 2024—(EP) Communication pursuant to Article 94(3) EPC—EP App. 22155761.4.

* cited by examiner

HEAD, PRINTING APPARATUS, AND HEAD CONTROLLER

CROSS REFERENCE TO RELATED APPLICATIONS

The present application claims priority from Japanese Patent Application Nos. 2021-058224, filed on Mar. 30, 2021, and 2021-143754 filed on Sep. 3, 2021 the disclosure of which is incorporated herein by reference in its entirety.

BACKGROUND

The present technique relates to a head for discharging a liquid, a printing apparatus, and a head controller.

A printer is known, which generates first to fourth driving pulses having different amplitudes, as driving signals for driving a piezoelectric element of a nozzle. The first to fourth driving pulses are continuously generated during one cycle for printing one pixel. One of the first to fourth driving pulses is selected and applied to the piezoelectric element of each of the nozzles. The nozzle jets an ink in an amount corresponding to the amplitude of the selected driving pulse to form a dot having a desired size.

SUMMARY

A head according to an aspect of the present disclosure includes a nozzle, a signal generator, and a separator.

The nozzle is configured to discharge a liquid by an energy generating element.

The signal generator is configured to generate, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform.

The separator is configured to separate a first driving waveform signal representing the first driving waveform or a second driving waveform signal representing the second driving waveform from the time division multiplex signal generated by the signal generator.

The energy generating element is configured to be driven by the first driving waveform signal or the second driving waveform signal separated by the separator.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

A printing apparatus according to another aspect of the present disclosure includes a head and a conveyer.

The head includes: a signal generator configured to generate, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform; a separator configured to separate a first driving waveform signal representing the first driving waveform or a second driving waveform signal representing the second driving waveform from the time division multiplex signal generated by the signal generator; an energy generating element configured to be driven by the first driving waveform signal or the second driving waveform signal separated by the separator; and a nozzle configured to discharge a liquid by driving of the energy generating element.

The conveyer is configured to convey a printing medium subjected to printing with the liquid discharged from the nozzle.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

A head controller, for a head including a nozzle configured to discharge a liquid by an energy generating element and a separator, according to another aspect of the present disclosure includes a signal generator.

The signal generator is configured to generate, based on at least a first data representing a first driving waveform and a second data representing a second driving waveform different from the first driving waveform, a time division multiplex signal including a first portion being a part of the first driving waveform, a second portion being other part of the first driving waveform, a third portion being a part of the second driving waveform and a fourth portion being other part of the second driving waveform.

The separator is configured to separate a first driving waveform signal representing the first driving waveform or a second driving waveform signal representing the second driving waveform from the time division multiplex signal generated by the signal generator.

The energy generating element is configured to be driven by the first driving waveform signal or the second driving waveform signal separated by the separator.

In the time division multiplex signal, the third portion being the part of the second driving waveform is aligned between the first portion being the part of the first driving waveform and the second portion being other part of the first driving waveform, and the second portion being other part of the first driving waveform is aligned between the third portion being the part of the second driving waveform and the fourth portion being other part of the second driving waveform.

The time division multiplex signal is capable of transmitting the first data and the second data via single signal line.

DETAILED DESCRIPTION

The four driving pulses are continuously generated during one cycle, but only one driving pulse is selected. On this account, the time, which is allotted to the three driving pulses that are not selected, is the waiting time of the nozzle.

The present disclosure has been made taking the foregoing circumstances into consideration, an object of which is to provide a head and a printing apparatus which make it possible to reduce the waiting time of a nozzle by adjusting the amplitude of a driving waveform applied to an energy application (energy generating) element.

In the head, the printing apparatus, and the head controller according to the aspect of the present disclosure, the time division multiplex signal is generated on the basis of the first data that represents the first driving waveform and the second data that represents the second driving waveform different from the first driving waveform. In the time division multiplex signal, the third portion as the part of the second driving waveform is present between the first portion as the part of the first driving waveform and the second portion as the part of the first driving waveform, and the second portion is present between the third portion and the fourth portion as the part of the second driving waveform. The first driving waveform signal that represents the first driving waveform or the second driving waveform signal that represents the second driving waveform is separated from the generated time division multiplex signal. The energy application element is driven by the first driving waveform signal or the second driving waveform signal. The amplitude of the driving waveform applied to the energy application element can be adjusted by selecting the first driving waveform signal or the second driving waveform signal. Further, only the cycle of any one driving waveform which is selected is included in one cycle for printing one pixel, and any cycle of any driving waveform which is not selected is not included. Therefore, it is possible to reduce the waiting time of the nozzle.

First Embodiment

Figure 1:
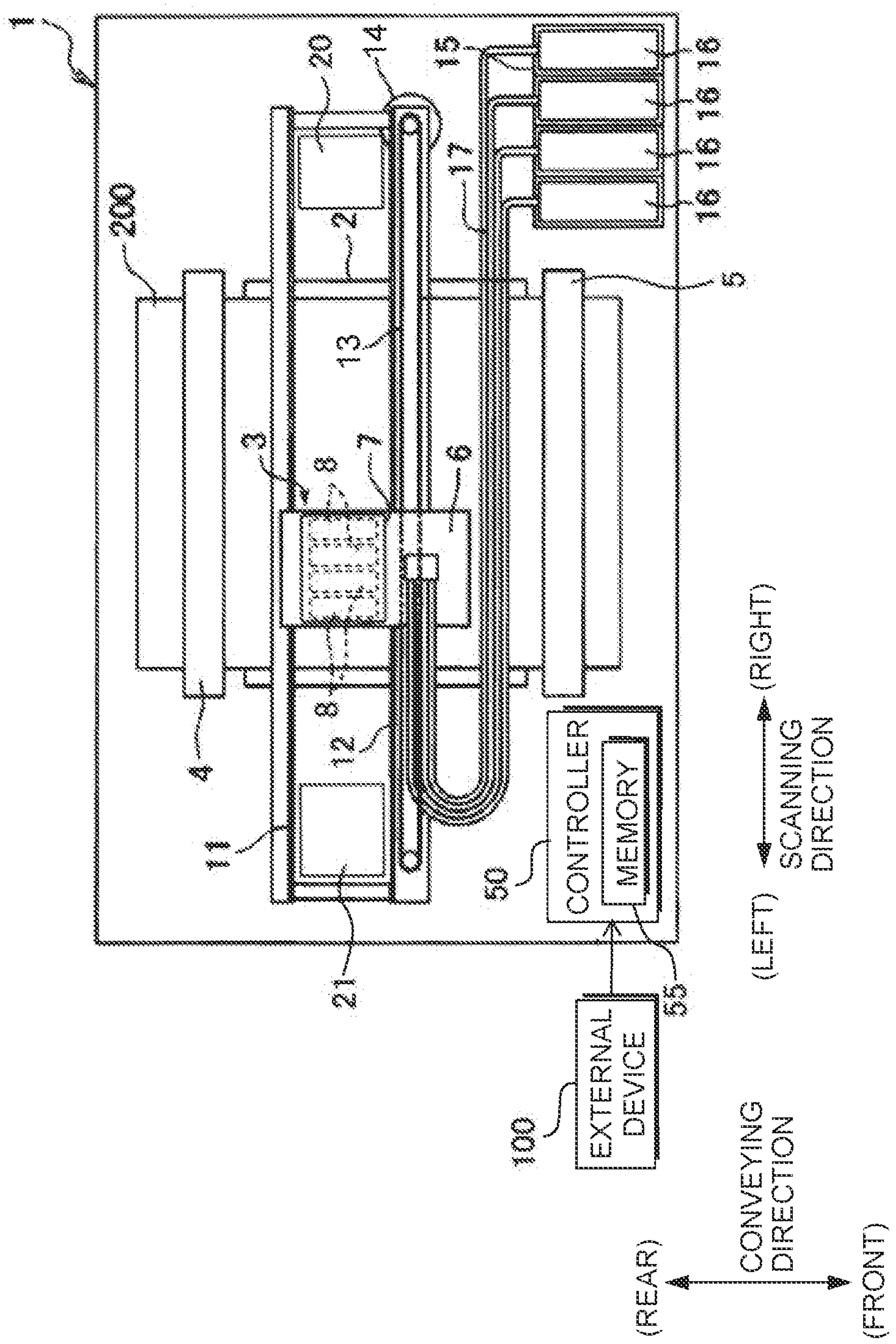
FIG. 1 is a plan view schematically illustrative of a printing apparatus.

The present invention will be explained below on the basis of the drawings to depict a printing apparatus according to a first embodiment. FIG. 1 is a plan view schematically illustrative of the printing apparatus. In the following explanation, the front, rear, left, and right depicted in FIG. 1 are used. The front-rear direction corresponds to the conveying direction, and the left-right direction corresponds to the scanning direction. Further, in the following explanation, the upward-downward direction is also used. The surface side of FIG. 1 corresponds to the upper side, and the underside corresponds to the lower side.

As depicted in FIG. 1, the printing apparatus 1 is provided with, for example, a platen 2, an ink discharge device 3, and conveying rollers 4, 5. Recording paper 200, which is a recording medium, is placed on the upper surface of the platen 2. The ink discharge device 3 records an image by discharging inks to the recording paper 200 placed on the platen 2. The ink discharge device 3 is provided with, for example, a carriage 6, a subtank 7, four ink-jet heads 8, and a circulating pump (not depicted).

Two guide rails 11, 12, which guide the carriage 6 and which extend in the left-right direction, are provided over or above the platen 2. An endless belt 13, which extends in the left-right direction, is connected to the carriage 6. The endless belt 13 is driven by a carriage driving motor 14. The carriage 6 is reciprocatively moved in the scanning direction in an area opposed to the platen 2 while being guided by the guide rails 11, 12 in accordance with the driving of the endless belt 13. More specifically, the carriage 6 performs the first movement in which the head is moved from a certain position to another position from the left to the right in the scanning direction, and the second movement in which the head is moved from the another position to the certain position from the right to the left in the scanning direction, in a state in which the carriage 6 supports the four ink-jet heads 8.

A cap 20 and a flashing receiver 21 are provided between the guide rails 11, 12. The cap 20 and the flashing receiver 21 are arranged under or below the ink discharge device 3. The cap 20 is arranged at right end portions of the guide rails 11, 12, and the flashing receiver 21 is arranged at left end portions of the guide rails 11, 12. Note that the cap 20 and the flashing receiver 21 may be arranged while the right and left are reversed. (That is, the positions of the both may be replaced with each other.)

The subtank 7 and the four ink-jet heads 8 are carried on the carriage 6, and they are reciprocatively moved in the scanning direction together with the carriage 6. The subtank 7 is connected to a cartridge holder 15 via tubes 17. An ink cartridge or ink cartridges 16 of one color or a plurality of colors (four colors in this embodiment) is/are installed to the cartridge holder 15. The four colors are exemplified, for example, by black, yellow, cyan, and magenta.

Four ink chambers (not depicted) are formed at the inside of the subtank 7. The four color inks, which are supplied from the four ink cartridges 16, are stored in the four ink chambers respectively.

The four ink-jet heads 8 are aligned in the scanning direction on the lower side of the subtank 7. A plurality of nozzles 80 (see FIG. 2) are formed on the lower surface of each of the ink-jet heads 8. One ink-jet head 8 corresponds to one color ink, which is connected to one ink chamber. That is, the four ink-jet heads 8 correspond to the four color inks respectively, which are connected to the four ink chambers respectively.

The ink-jet head 8 is provided with an ink supply port and an ink discharge port. The ink supply port and the ink discharge port are connected to the ink chamber of the subtank 7, for example, via tubes. A circulating pump intervenes between the ink supply port and the ink chamber.

The ink, which is fed from the ink chamber by the circulating pump, passes through the ink supply port to flow into the ink-jet head 8, and the ink is discharged (ejected) from the nozzle 80. The ink, which has not been discharged from the nozzle 80, passes through the ink discharge port, and the ink returns to the ink chamber. The ink is circulated between the ink chamber and the ink-jet head 8. The four ink-jet heads 8 discharge the four color inks supplied from the subtank 7 onto the recording paper 200, while being moved in the scanning direction together with the carriage 6.

As depicted in FIG. 1, the conveying roller 4 is arranged on the upstream side (rear side) in the conveying direction as compared with the platen 2. The conveying roller 5 is arranged on the downstream side (front side) in the conveying direction as compared with the platen 2. The two conveying rollers 4, 5 are synchronously driven by a motor (not depicted). The two conveying rollers 4, 5 convey the recording paper 200 placed on the platen 2 in the conveying direction orthogonal to the scanning direction. The printing apparatus 1 is provided with a controller 50. The controller 50 is provided with, for example, CPU or a logic circuit (for example, FPGA), and a memory (storage) 55 such as a nonvolatile memory and RAM or the like. The controller 50 receives the printing job and the driving waveform data as needed from an external device 100, and the controller 50 stores the printing job and the driving waveform data in the memory 55. The controller 50 controls the driving of, for example, the ink discharge device 3 and the conveying roller 4 on the basis of the printing job to execute the printing process.

Figure 2:
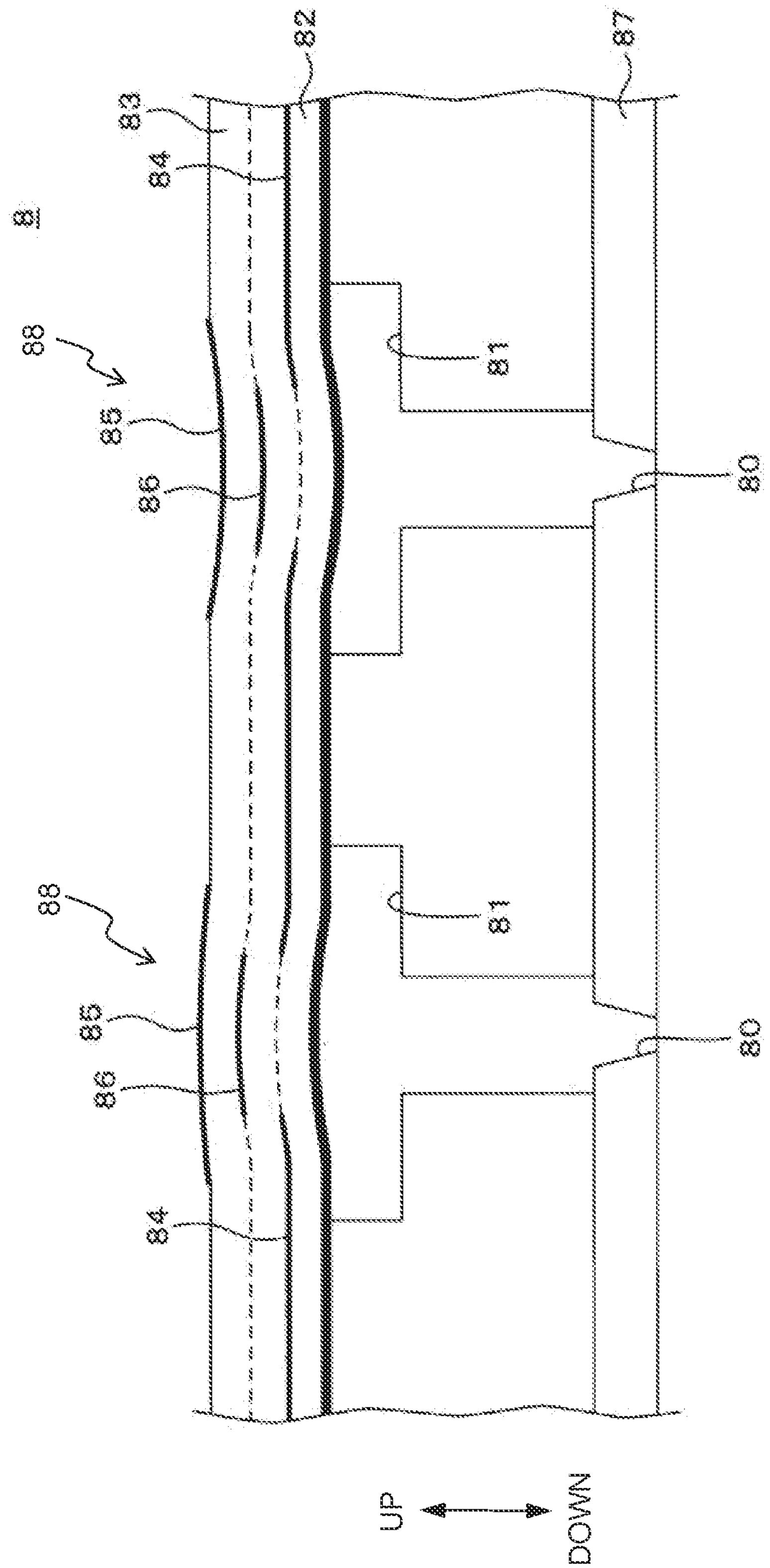
FIG. 2 is a partial enlarged sectional view schematically illustrative of an ink-jet head.

FIG. 2 is a partial enlarged sectional view schematically illustrative of the ink-jet head 8. The ink-jet head 8 is provided with a plurality of pressure chambers 81. The plurality of pressure chambers 81 constitute a plurality of pressure chamber arrays. A vibration plate 82 is formed on the upper side of the pressure chamber 81. A layered piezoelectric member 83 is formed on the upper side of the vibration plate 82. A first common electrode 84 is formed between the piezoelectric member 83 and the vibration plate 82 on the upper side of each of the pressure chambers 81.

A second common electrode 86 is provided at the inside of the piezoelectric member 83. The second common electrode 86 is arranged on the upper side of each of the pressure chambers 81 and on the upper side of the first common electrode 84. The second common electrode 86 is arranged at the position at which the second common electrode 86 is not opposed to the first common electrode 84. An individual electrode 85 is formed on the upper surface of the piezoelectric member 83 on the upper side of each of the pressure chambers 81. The individual electrode 85 is vertically opposed to the first common electrode 84 and the second common electrode 86 with the piezoelectric member 83 intervening therebetween. The vibration plate 82, the piezoelectric member 83, the first common electrode 84, the individual electrode 85, and the second common electrode 86 constitute an actuator 88.

A nozzle plate 87 is provided under or below the respective pressure chambers 81. A plurality of nozzles 80, which vertically penetrate, are formed through the nozzle plate 87. Each of the nozzles 80 is arranged on the lower side of each of the pressure chambers 81. The plurality of nozzles 80 constitute a plurality of nozzle arrays which extend along the pressure chamber arrays.

The first common electrode 84 is connected to the COM terminal, i.e. the ground in this embodiment. The second common electrode 86 is connected to the VCOM terminal. The VCOM voltage is higher than the COM voltage. The individual electrode 85 is connected to a switch group 54 (see FIG. 3). The High or Low voltage is applied to the individual electrode 85. The piezoelectric member 83 is deformed, and the vibration plate 82 is vibrated. The ink is discharged from the pressure chamber 81 via the nozzle 80 in accordance with the vibration of the vibration plate 82.

Figure 3:
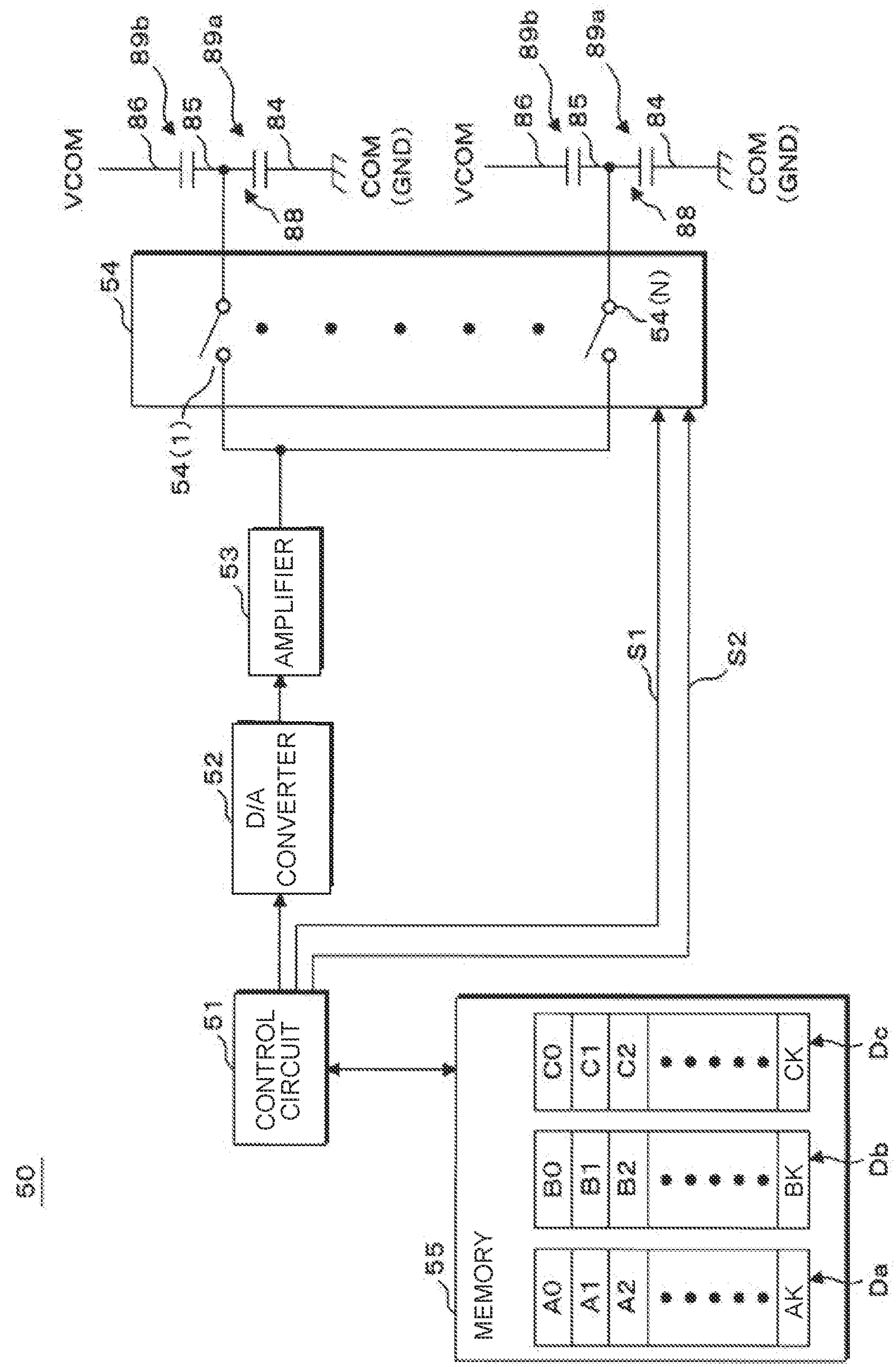
FIG. 3 is a block diagram of a controller.

FIG. 3 is a block diagram of the controller 50. The controller 50 is provided with a control circuit 51, a D/A converter (digital-analog converter) 52, an amplifier 53, the switch group 54, and a memory 55. The driving waveform data is stored in the memory 55. The driving waveform data is the data which represents the voltage waveform applied to the individual electrode 85, i.e., the driving waveform for driving the actuator 88. The driving waveform data is the quantized data. In this embodiment, the driving waveform data Da, Db, Dc are stored in the memory 55.

The D/A converter 52 converts the digital signal into the analog signal. The amplifier 53 amplifies the analog signal. The switch group 54 is provided with a plurality of nth switches 54(*n*) (n=1, 2, . . . , N). Each of the plurality of nth switches 54(*n*) is configured, for example, by an analog switch IC. One end of each of the plurality of nth switches 54(*n*) is connected to the amplifier 53 via a common bus. The other end of each of the plurality of nth switches 54(*n*) is connected to the individual electrode 85 corresponding to each of the plurality of nozzles 80. In other words, one nth switch 54(*n*) is provided for one actuator 88.

A first capacitor 89*a* is configured by the individual electrode 85, the first common electrode 84, and the piezoelectric member 83. A second capacitor 89*b* is configured by the individual electrode 85, the second common electrode 86, and the piezoelectric member 83.

Figure 4:
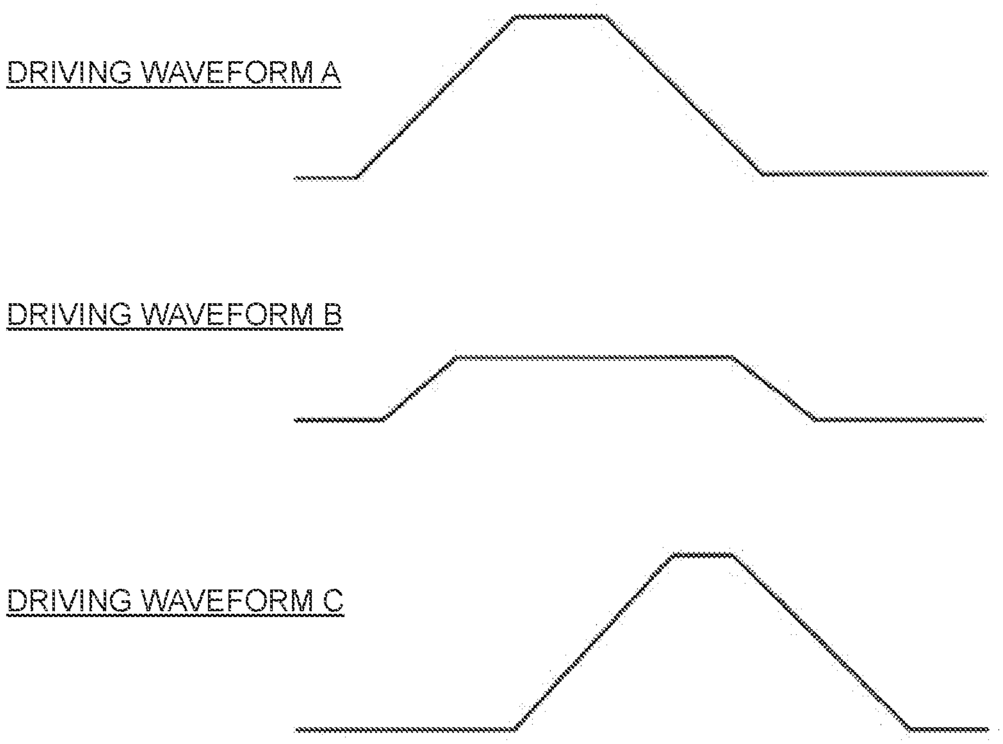
FIG. 4 is an explanatory drawing to explain examples of driving waveforms A, B, C.

FIG. 4 is an explanatory drawing to explain examples of driving waveforms A, B, C. Each of the driving waveforms A, B, C is the waveform which is provided in order that the piezoelectric member 83 is deformed, the vibration plate 82 is vibrated, and the ink, which is present in the pressure chamber 81, is discharged via the nozzle 80 after allowing the ink to pass through the descender in accordance with the vibration of the vibration plate 82. For example, the driving waveform A is the waveform which is provided in order to discharge the large droplet. The driving waveform B is the waveform which is provided in order to discharge the middle droplet. The driving waveform C is the waveform which is provided in order to discharge the large droplet, but the driving waveform C has the discharge timing different from that of the driving waveform A. In FIG. 4, the right side indicates the past state as compared with the left side. The states depicted in FIG. 5 to FIG. 7, FIG. 10, and FIG. 15 are depicted in the same manner as described above. The driving waveform data Da is the quantized data of the driving waveform A, the driving waveform data Db is the quantized data of the driving waveform B, and the driving waveform data Dc is the quantized data of the driving waveform C. The driving waveform data Da has the quantized data Ak (k=0, 1, 2, . . . , K), the driving waveform data Db has the quantized data Bk (k=0, 1, 2, . . . , K), and the driving waveform data Dc has the quantized data Ck (k=0, 1, 2, . . . , K).

Figure 5:
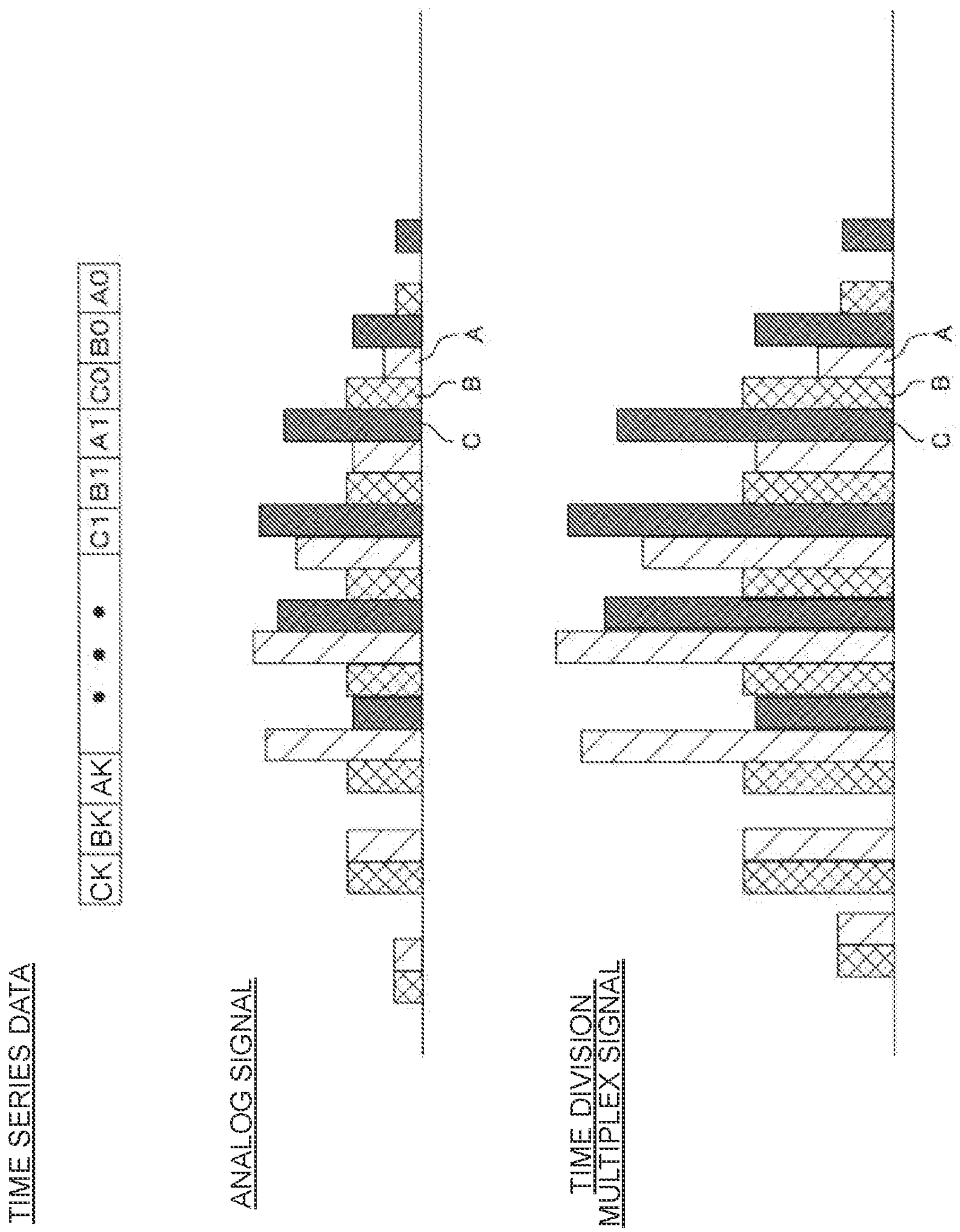
FIG. 5 is an explanatory drawing to explain examples of the time series data, the analog signal, and the time division multiplex signal.

FIG. 5 is an explanatory drawing to explain examples of the time series data, the analog signal, and the time division multiplex signal. In FIG. 5, A, B, C indicate the correspondence to the driving waveforms A, B, C respectively. When the actuator 88 is driven, the control circuit 51 accesses the memory 55 to acquire the driving waveform data Da, Db, Dc so that the time series data is prepared. In the time series data, the data Ak, Bk, Ck are successively aligned while providing time intervals Δt. The data Ak, Bk, Ck are aligned in an order of A0, B0, C0, A1, B1, C1, . . . , AK, BK, CK. The time series data is the digital signal. Note that the time interval Δt is the reciprocal of a predetermined sampling frequency. The quantized data Ak, Bk, Ck are aligned in the order of A0, B0, C0, A1, B1, C1, . . . , AK, BK, CK for every time (at a time interval) corresponding to the reciprocal of the predetermined sampling frequency. In other words, the data length of the quantized data Ak, Bk, Ck is not more than the length corresponding to the reciprocal of the predetermined sampling frequency. Further, the quantized data A0 is continuous with the quantized data B0, the quantized data B0 is continuous with the quantized data C0, and the quantized data C0 is continuous with the quantized data A1. In other words, the quantized data C0, any other quantized data, and any data of any other waveform are absent between the quantized data A0 and the quantized data B0. Further, the quantized data A0, any other quantized data, and any data of any other waveform are absent between the quantized data B0 and the quantized data C0. Further, the quantized data B0, any other quantized data, and any data of any other waveform are absent between the quantized data C0 and the quantized data A1. Note that the sampling frequency is 24 MHz. The data length of each of the quantized data Ak, Bk, Ck is about 41 ns.

The control circuit 51 outputs the time series data to the D/A converter 52. As depicted in FIG. 5, the D/A converter 52 converts the time series data into the analog signal which is outputted to the amplifier 53. The amplifier 53 amplifies the inputted analog signal, and the amplified signal is outputted to the switch group 54. As depicted in FIG. 5, the analog signal, which is amplified by the amplifier 53, configures the time division multiplex signal. In other words, the time division multiplex signal is not the analog signal which corresponds to only the data Ak, the analog signal which corresponds to only the data Bk, and the analog signal which corresponds to only the data Ck. Further, the time division multiplex signal is such a signal that at least the analog signal corresponding to the set of three data in total, i.e., the set of one data Ak, one data Bk, and one data Ck and the analog signal corresponding to the set of three data in total, i.e., the set of one data Ak+1, one data Bk+1, and one data Ck+1 are continued in time series. For example, the number of the time division multiplex signal is one in FIG. 5. With reference to FIG. 5, the analog signal corresponding to the data C0 seems to be isolated. However, such a situation results from the fact that the analog signal, which corresponds to the set of the three data in total, i.e., the set of the data A0, the data B0, and the data C0 and which is in such a state that the data A0 and the data B0 are zero, is continued in time series to the analog signal which corresponds to the set of the three data in total, i.e., the set of the data A1, the data B1, and the data C1 and which is in such a state that the data A1 is zero. Further, the analog signal corresponding to the set of the data AK and the data BK seems to be isolated. However, such a situation results from the fact that the analog signal, which corresponds to the set of the three data in total, i.e., the set of the data AK−1, the data BK−1, and the data CK−1 and which is in such a state that the data CK−1 is zero, is continued in time series to the analog signal which corresponds to the set of the three data in total, i.e., the set of the data AK, the data BK, and the data CK. Further, the reason, why the analog signal corresponding to the set of the data AK−1 and the data BK−1 seems to be isolated, is the same as or equivalent to the above. Therefore, the analog signal depicted in FIG. 5 can be dealt with as one time division multiplex signal. In the time division multiplex signal, it is assumed that the portion corresponding to the data Ak−1 is designated as "first portion", the portion corresponding to the data Ak is designated as "second portion", the portion corresponding to the data Bk−1 is designated as "third portion", and the portion corresponding to the data Bk is designated as "fourth portion". On this assumption, the third portion is present (aligned) between the first portion and the second portion, and the second portion is present (aligned) between the third portion and the fourth portion. In other words, the first portion is continuous with the third portion, the third portion is continuous with the second portion, and the second portion is continuous with the fourth portion. That is, the second portion, the fourth portion, and any other waveform are absent between the first portion and the third portion in the time division multiplex signal. Further, the first portion, the fourth portion, and any other waveform are absent between the third portion and the second portion in the time division multiplex signal. Further, the first portion, the third portion, and any other waveform are absent between the second portion and the fourth portion in the time division multiplex signal. Note that the same or equivalent relationship also holds between the data Ak and the data Ck, and the same or equivalent relationship also holds between the data Bk and the data Ck. The control circuit 51, the D/A converter 52, the amplifier 53, and the memory 55 configure the signal generator (multiplexer, multiplexing unit). One time division multiplex signal is included in one discharge driving cycle. For example, if the discharge driving frequency (jetting frequency) is 100 kHz, then one discharge driving cycle (jetting cycle) is 10 μs, and one time division multiplex signal has a length less than 10 μs. It is preferable that three or more data Ak, three or more data Bk, and three or more data Ck are present in one time division multiplex signal. The reason will be described later on.

The control circuit 51 outputs, to the switch group 54, the switch control signal S1 for controlling the opening/closing of the plurality of nth switches 54(*n*), the synchronization signal S2*a* corresponding to the driving waveform A, the synchronization signal S2*b* corresponding to the driving waveform B, and the synchronization signal S2*c* corresponding to the driving waveform C. Note that the three synchronization signals S2*a*, S2*b*, S2*c* are simply expressed as "synchronization signal S2" as well (see FIG. 3). The switch control signal S1 includes the first selection information which indicates that any one of the plurality of nth switches 54(*n*) is selected, and the second selection information which indicates that any one of the three synchronization signals S2*a*, S2*b*, S2*c* is selected. The first selection information and the second selection information are linked.

Figure 6:
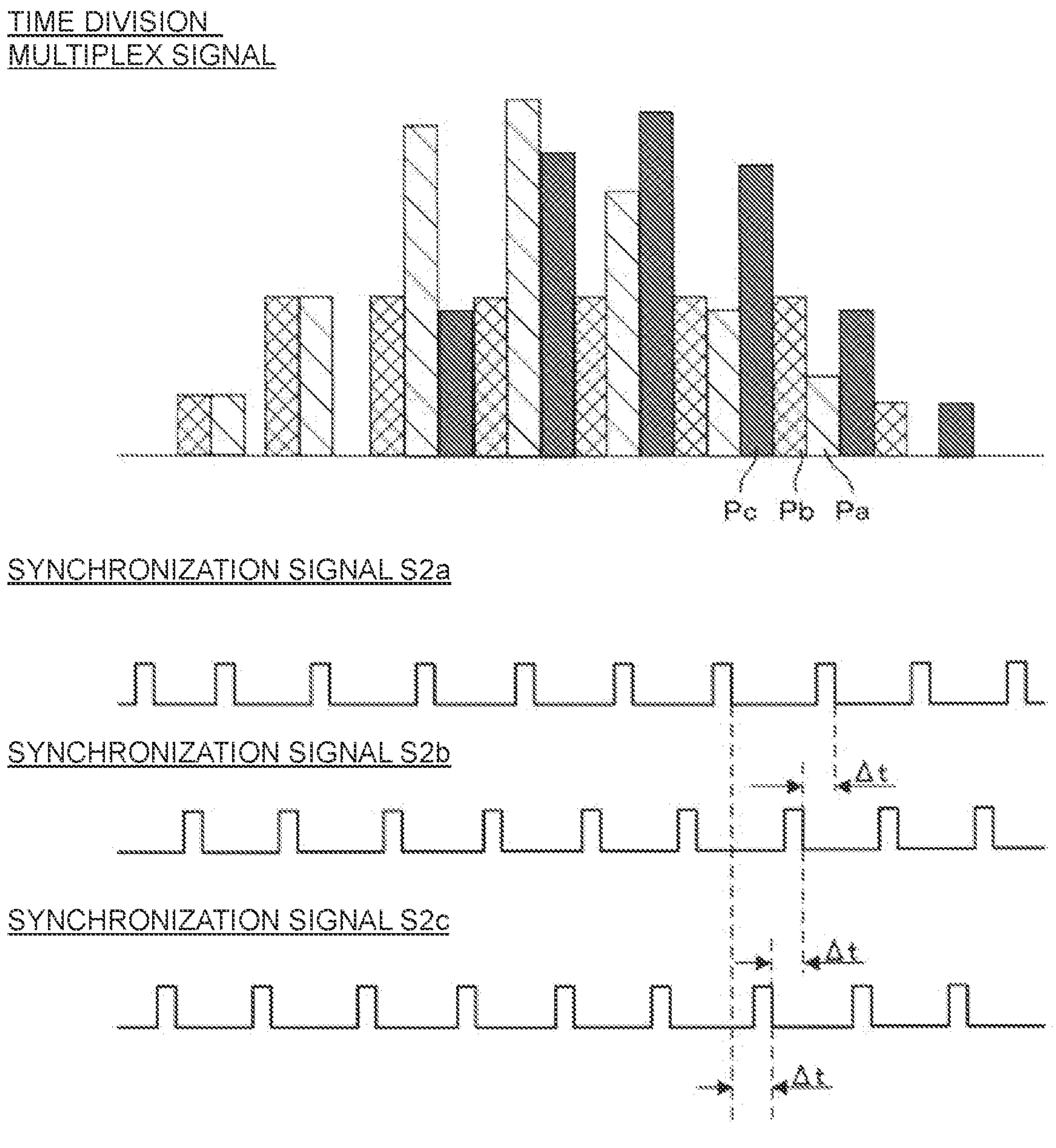
FIG. 6 is an explanatory drawing to explain the relationship between the time division multiplex signal and the synchronization signals.

FIG. 6 is an explanatory drawing to explain the relationship between the time division multiplex signal and the synchronization signals S2*a*, S2*b*, S2*c*. The synchronization signals S2*a*, S2*b*, S2*c* are pulse waves. The time interval Δt is provided between the rising point of time of the pulse of the synchronization signal S2*a* and the rising point of time of the pulse of the synchronization signal S2*b*. Further, the time interval Δt is provided between the rising point of time of the pulse of the synchronization signal S2*b* and the rising point of time of the pulse of the synchronization signal S2*c*, and the time interval Δt is provided between the rising point of time of the pulse of the synchronization signal S2*c* and the rising point of time of the pulse of the synchronization signal S2*a*. As described above, the data Ak, Bk, Ck, which configure the time series data, are successively aligned while providing the time intervals Δt. On this account, if the time division multiplex signal is accessed at the rising point of time of the pulse of the synchronization signal S2*a*, it is possible to acquire the driving waveform signal Pa which corresponds to the data Ak and which represents the driving waveform A. If the time division multiplex signal is accessed at the rising point of time of the pulse of the synchronization signal S2*b*, it is possible to acquire the driving waveform signal Pb which corresponds to the data Bk and which represents the driving waveform B. If the time division multiplex signal is accessed at the rising point of time of the pulse of the synchronization signal S2*c*, it is possible to acquire the driving waveform signal Pc which corresponds to the data Ck and which represents the driving waveform C. In other words, one type of the time division multiplex signal is inputted into one nth switch 54(*n*), and the one nth switch 54(*n*) separates any one of the driving waveform signal Pa that represents the driving waveform A, the driving waveform signal Pb that represents the driving waveform B, and the driving waveform signal Pc that represents the driving waveform C.

The switch group 54 opens/closes the selected nth switch 54(*n*) at the opening/closing timing indicated by the selected synchronization signal S2*a* to S2*c*. In other words, the switch group 54 opens/closes the nth switch 54(*n*) in accordance with the predetermined sampling frequency.

Figure 7:
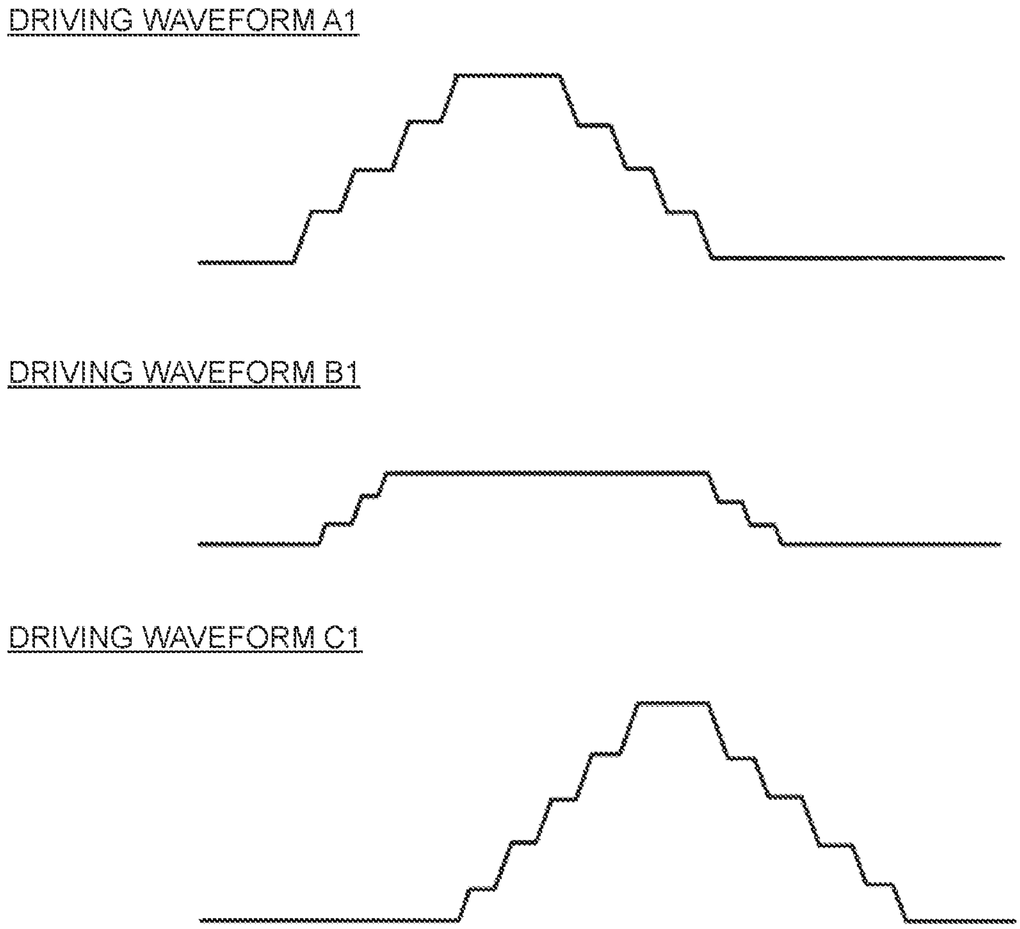
FIG. 7 is a schematic drawing of the driving waveform inputted into an actuator by opening/closing an nth switch.

FIG. 7 is a schematic drawing of the driving waveform inputted into the actuator 88 by opening/closing the nth switch 54(*n*). When the synchronization signal S2*a* is selected, then the switch group 54 closes the nth switch 54(*n*) if the pulse of the synchronization signal S2*a* is in the high level interval (period), or the switch group 54 opens the nth switch 54(*n*) if the pulse of the synchronization signal S2*a* is in the low level interval (period). The electric charge, which is applied to the individual electrode 85 when the nth switch 54(*n*) is closed, is retained by the first capacitor 89*a* and the second capacitor 89*b*. As depicted in FIG. 7, the driving waveform A1 is inputted into the actuator 88. In other words, the driving waveform signal Pa is separated from the time division multiplex signal in accordance with the predetermined sampling frequency, and the actuator 88 is driven by the driving waveform signal Pa. Note that three or more data Ak are required in order to express the concave/convex (uneven) shape of the driving waveform signal Pa.

When the synchronization signal S2*b* is selected, then the switch group 54 closes the nth switch 54(*n*) if the pulse of the synchronization signal S2*b* is in the high level interval, or the switch group 54 opens the nth switch 54(*n*) if the pulse of the synchronization signal S2*b* is in the low level interval. The electric charge, which is applied to the individual electrode 85 when the nth switch 54(*n*) is closed, is retained by the first capacitor 89*a* and the second capacitor 89*b*. As depicted in FIG. 7, the driving waveform B1 is inputted into the actuator 88. In other words, the driving waveform signal Pb is separated from the time division multiplex signal in accordance with the predetermined sampling frequency, and the actuator 88 is driven by the driving waveform signal Pb. Note that three or more data Bk are required in order to express the concave/convex (uneven) shape of the driving waveform signal Pb.

When the synchronization signal S2*c* is selected, then the switch group 54 closes the nth switch 54(*n*) if the pulse of the synchronization signal S2*c* is in the high level interval, or the switch group 54 opens the nth switch 54(*n*) if the pulse of the synchronization signal S2*c* is in the low level interval. The electric charge, which is applied to the individual electrode 85 when the nth switch 54(*n*) is closed, is retained by the first capacitor 89*a* and the second capacitor 89*b*. As depicted in FIG. 7, the driving waveform C1 is inputted into the actuator 88. In other words, the driving waveform signal Pc is separated from the time division multiplex signal in accordance with the predetermined sampling frequency, and the actuator 88 is driven by the driving waveform signal Pc. Note that three or more data Ck are required in order to express the concave/convex (uneven) shape of the driving waveform signal Pc.

The predetermined sampling frequency described above is not less than the resonance frequency of the ink-jet head 8. The resonance frequency of the ink-jet head 8 is either the resonance frequency provided when the pressure chamber 81 is not filled with the ink (liquid), or the resonance frequency provided when the pressure chamber 81 is filled with the ink. For example, if the resonance frequency of the ink-jet head 8, which is provided when the pressure chamber 81 is not filled with the ink, is 100 kHz, the resonance frequency of the ink-jet head 8, which is provided when the pressure chamber 81 is filled with the ink, is less than 100 kHz. Specifically, the resonance frequency of the ink-jet head 8, which is provided when the pressure chamber 81 is filled with the ink, is 90 kHz. In other words, the resonance frequency of the ink-jet head 8, which is provided when the pressure chamber 81 is not filled with the ink, is larger than the resonance frequency of the ink-jet head 8 which is provided when the pressure chamber 81 is filled with the ink.

Figure 8:
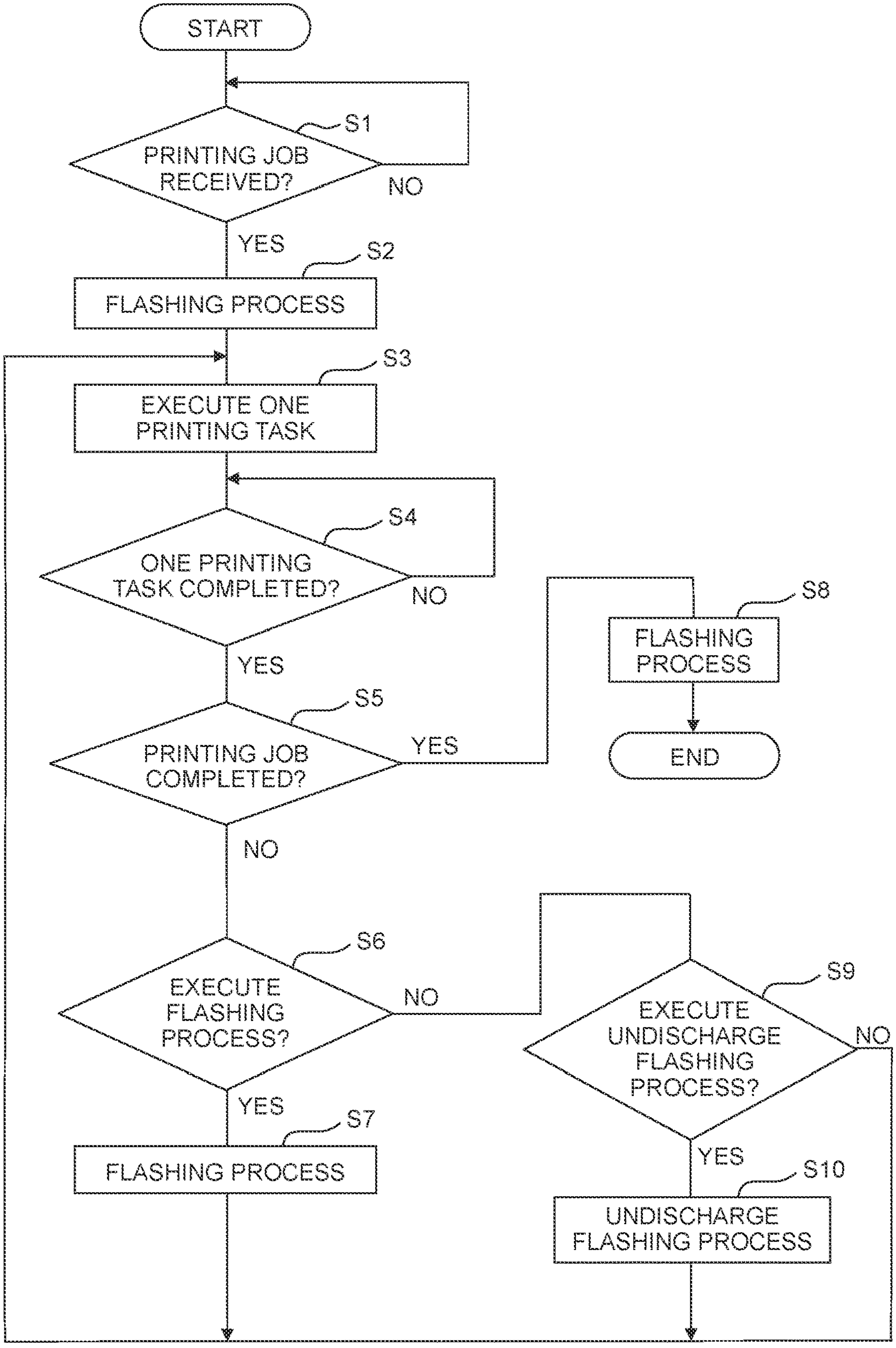
FIG. 8 is a flow chart to explain a printing process performed by the controller.

FIG. 8 is a flow chart to explain a printing process performed by the controller 50. The controller 50 determines whether or not the printing job is received from the external device 100 (S1). If the printing job is not received (S1: NO), the controller 50 returns the process to Step S1. If the printing job is received (S1: YES), the controller 50 executes the flashing process (S2). The flashing process is the process in which the inks are discharged from the nozzles 80 for any purpose other than the purpose of the printing. The flashing process is executed, for example, at or above the flashing receiver 21.

The controller 50 executes one printing task (S3). The printing task is the unit for constructing the printing job. Specifically, the printing task is the liquid discharge process performed during the period in which the ink-jet head 8 is moved rightwardly or leftwardly in an amount corresponding to the left-right width of the recording paper 200. Subsequently, the controller 50 determines whether or not one printing task is completed (S4). Note that the carriage 6 performs one scanning in one printing task. If one printing task is not completed (S4: NO), the process is returned to Step S4. If one printing task is completed (S4: YES), the controller 50 determines whether or not the printing job is completed (S5).

If one printing job is completed (S5: YES), then the controller 50 executes the flashing process (S8), and the printing process is terminated. If one printing job is not completed (S5: NO), the controller 50 determines whether or not the timing arrives to execute (perform) the flashing process (S6). Since the time division multiplex signal is generated by mixing the driving waveforms A, B and C, the time division multiplex signal maintains the state in which the driving waveforms A, B and C are mixed throughout one printing job. Thus, the time division multiplex signal for one printing task is configured by three types of analog signals only. The time division multiplex signal is also configured by the three types of analog signals only for one cycle ranging from the rising to the falling of the time division multiplex signal in one discharge driving cycle. The flashing process is periodically executed for the purpose of the maintenance of the nozzles 80. If the timing arrives to perform the flashing process (S6: YES), then the controller 50 executes the flashing process (S7), and the process is returned to Step S3. If the timing does not arrive to perform the flashing process (S6: NO), the controller 50 determines whether or not the timing arrives to execute the undischarge flashing process (S9).

The undischarge flashing process is the process to be performed in order to prevent the nozzles 80 from being dried without performing the discharge of the ink. In particular, the piezoelectric member 83 is slightly deformed to swing the surface (meniscus) of the ink in this process. For example, the process is executed at or above the cap 20. The undischarge flashing is periodically executed. If the timing arrives to execute the undischarge flashing process (S9: YES), then the controller 50 executes the undischarge flashing process (S10), and the process is returned to Step S3. In Step S10, the controller 50 supplies, to the individual electrode 85, the driving waveform corresponding to the undischarge flashing process. If the timing does not arrive to execute the undischarge flashing process (S9: NO), the controller 50 returns the process to Step S3.

The controller 50 may perform the generation of the time division multiplex signal and the separation of the driving waveform signal in any one of the term during the execution of the flashing process (S2, S7, S8) or during the execution of the printing task (S3). That is, the generation of the time division multiplex signal and the separation of the driving waveform signal may be performed during the driving of the actuator 88.

In the ink-jet head 8 and the printing apparatus 1 according to the first embodiment, the time division multiplex signal is generated on the basis of the respective driving waveform data Da, Db, Dc which represent the respective driving waveforms A, B, C. The driving waveform signal Pa that represents the driving waveform A, the driving waveform signal Pb that represents the driving waveform B, and the driving waveform signal Pc that represent the driving waveform C are separated from the generated time division multiplex signal. The actuator 88 is driven by the driving waveform signal Pa, Pb, or Pc. It is possible to adjust the amplitude of the driving waveform to be applied to the actuator 88 by selecting the driving waveform signal Pa, Pb, or Pc. Further, only the cycle of any one selected driving waveform A, B, or C is included in one cycle for printing one pixel, and the cycle of unselected driving waveform is not included. On this account, it is possible to reduce the waiting time of the nozzle 80.

The control circuit 51 reads the data values of the driving waveform data Da, Db, Dc from the memory 55, and the data values are transmitted while being aligned in time series. Thus, it is possible to realize the generation of the time division multiplex signal.

The control circuit 51 inputs the data values of the driving waveform data Da, Db, Dc into the D/A converter 52, and the data values are amplified by the amplifier 53. Thus, it is possible to increase the amplitude of the time division multiplex signal.

The driving waveform signal Pa that represents the driving waveform A, the driving waveform signal Pb that represents the driving waveform B, and the driving waveform signal Pc that represents the driving waveform C are separated from the time division multiplex signal with the sampling frequency which is not less than the resonance frequency of the ink-jet head 8. The resonance frequency of the ink-jet head 8 is the resonance frequency which is provided when the pressure chamber 81 is not filled with the ink. On this account, the sampling error does not exert any influence on the action of the actuator 88. It is possible to ignore the sampling error.

The driving waveform signal Pa that represents the driving waveform A, the driving waveform signal Pb that represents the driving waveform B, and the driving waveform signal Pc that represents the driving waveform C are separated from the time division multiplex signal with the sampling frequency which is not less than the resonance frequency of the ink-jet head 8. The resonance frequency of the ink-jet head 8 is the resonance frequency which is provided when the pressure chamber 81 is filled with the ink. In this case, when the circuit is prepared, it is possible to suppress the increase in the number of switching amplifiers.

The time division multiplex signal is inputted into the switch group 54. Further, the switching control signal S1 and the synchronization signals S2*a* to S2*c* to represent the opening/closing timings are inputted into the nth switch 54(*n*). The nth switch 54(*n*) is opened/closed on the basis of the switch control signal S1 and the synchronization signal S2*a* to S2*c*. It is possible to separate the driving waveform signals Pa to Pc from the time division multiplex signal.

The control circuit 51 outputs the switch control signal S1 and the synchronization signals S2*a* to S2*c* to the switch group 54 to control the opening/closing of the nth switch 54(*n*).

In the first embodiment, the actuator 88 has the three-layered structure. However, the actuator 88 may have a two-layered structure. The actuator 88 is based on the piezoelectric system. However, the actuator 88 may be based on the bubble-jet system (the ink heating type ink-jet system) or the electrostatic force system. The number of the waveform signals is not limited to three. The number may be two or four or more.

Second Embodiment

Figure 9:
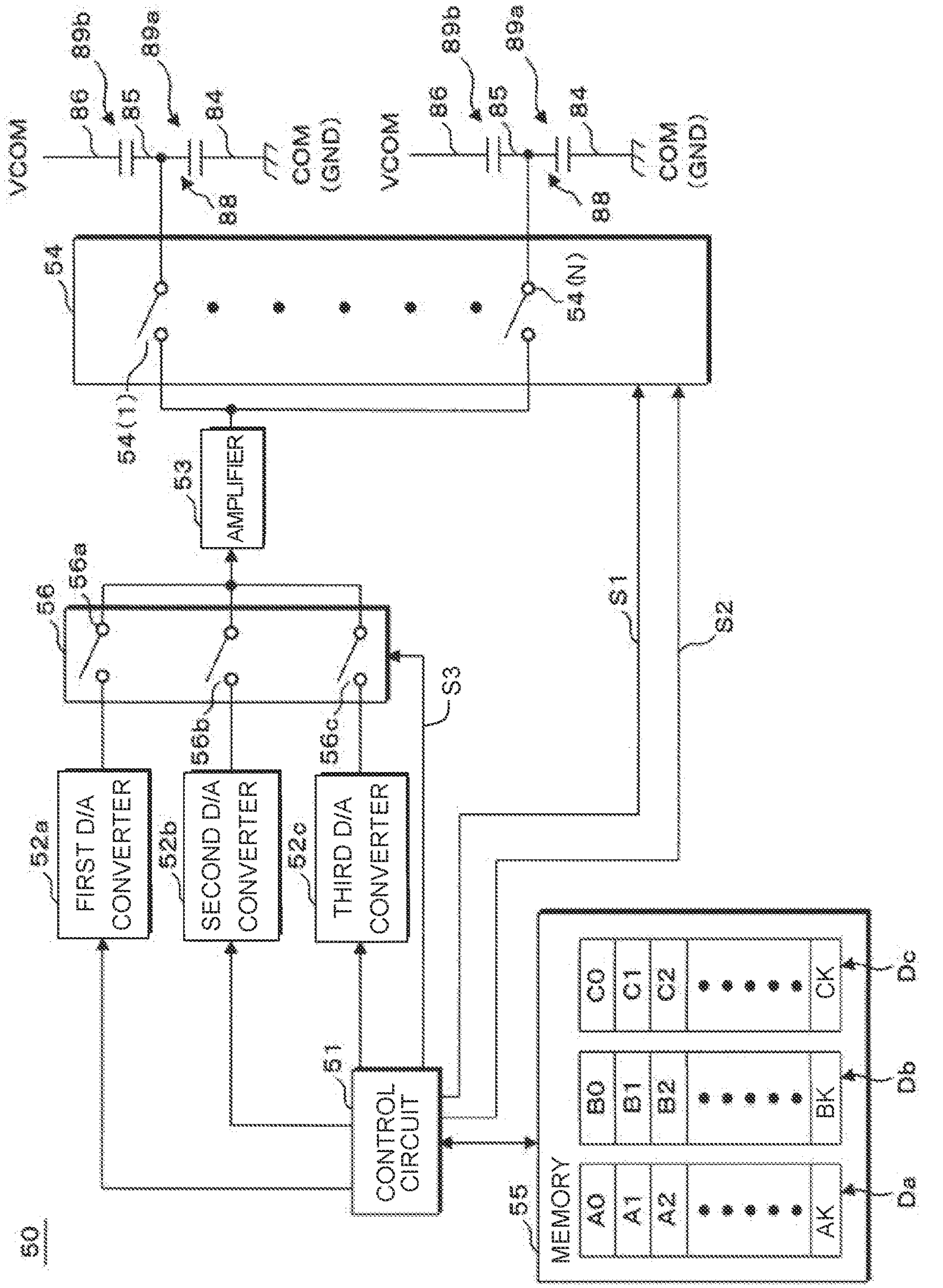
FIG. 9 is a block diagram of a controller.
Figure 10:
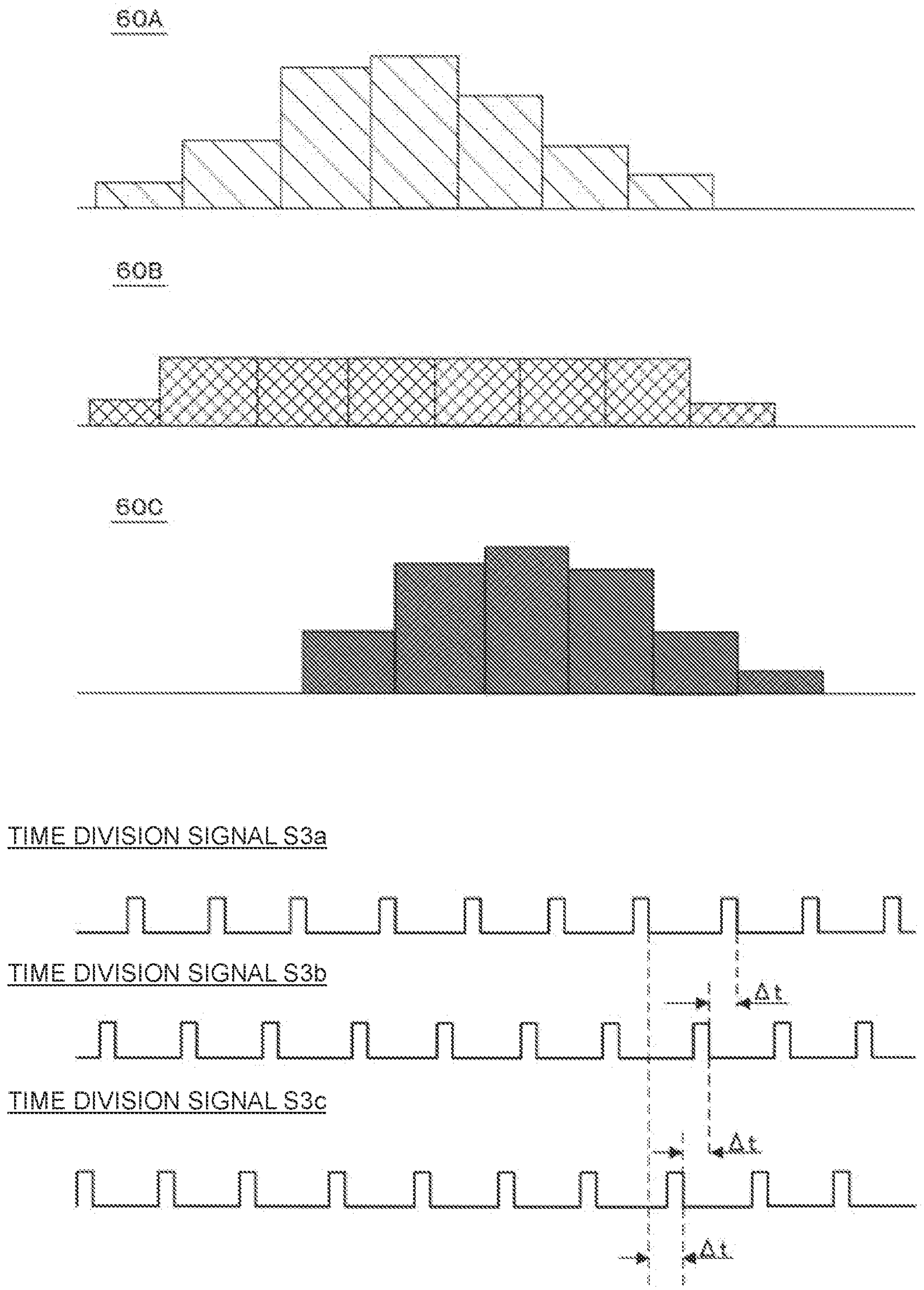
FIG. 10 is an explanatory drawing to explain the relationship between the analog signal and the time division signal.

The present invention will be explained below on the basis of the drawings which depict a printing apparatus 1 according to a second embodiment. Constitutive components according to the second embodiment, which are the same as or equivalent to the constitutive components according to the first embodiment, are designated by the same reference numerals as those of the first embodiment, any detailed explanation of which will be omitted. FIG. 9 is a block diagram of a controller 50. FIG. 10 is an explanatory drawing to explain the relationship between the analog signal 60A to 60C and the time division signal S3*a* to S3*c*.

The controller 50 is provided with a control circuit 51, a first D/A converter 52*a*, a second D/A converter 52*b*, a third D/A converter 52*c*, a second switch control unit 56, an amplifier 53, a switch group 54, and a memory 55. The second switch control unit 56 is provided with a first switch 56*a*, a second switch 56*b*, and a third switch 56*c*.

When the actuator 88 is driven, the control circuit 51 accesses the memory 55 to acquire the driving waveform data Da which is outputted to the first D/A converter 52*a*. The control circuit 51 accesses the memory 55 to acquire the driving waveform data Db which is outputted to the second D/A converter 52*b*. The control circuit 51 accesses the memory 55 to acquire the driving waveform data Dc which is outputted to the third D/A converter 52*c*.

As depicted in FIG. 10, the first D/A converter 52*a*, the second D/A converter 52*b*, and the third D/A converter 52*c* output analog signals 60A, 60B, 60C respectively. The control circuit 51 outputs, to the second switch control unit

56, a time division signal S3*a* which corresponds to the analog signal 60A, a time division signal S3*b* which corresponds to the analog signal 60B, and a time division signal S3*c* which corresponds to the analog signal 60C. Note that the three time division signals S3*a*, S3*b*, S3*c* are simply referred to as "time division signal S3" as well (see FIG. 9).

The time division signals S3*a*, S3*b*, S3*c* are pulse waves. The time interval Δt is provided between the rising point of time of the pulse of the time division signal S3*a* and the rising point of time of the pulse of the time division signal S3*b*. Further, the time interval Δt is provided between the rising point of time of the pulse of the time division signal S3*b* and the rising point of time of the pulse of the time division signal S3*c*, and the time interval Δt is provided between the rising point of time of the pulse of the time division signal S3*c* and the rising point of time of the pulse of the time division signal S3*a*. The respective time division signals S3*a*, S3*b*, S3*c* correspond to the respective synchronization signals S2*a*, S2*b*, S2*c* described above.

The first switch 56*a* is closed if the pulse of the time division signal S3*a* is in the high level interval, or the first switch 56*a* is opened if the pulse of the time division signal S3*a* is in the low level interval. The second switch 56*b* is closed if the pulse of the time division signal S3*b* is in the high level interval, or the second switch 56*b* is opened if the pulse of the time division signal S3*b* is in the low level interval. The third switch 56*c* is closed if the pulse of the time division signal S3*c* is in the high level interval, or the third switch 56*c* is opened if the pulse of the time division signal S3*c* is in the low level interval. Note that the first switch 56*a*, the second switch 56*b*, and the third switch 56*c* are simultaneously opened in some cases, but they are not simultaneously closed, for the following reason. That is, if the first switch 56*a*, the second switch 56*b*, and the third switch 56*c* are simultaneously closed, the analog signals 60A, 60B, 60C are present in a mixed manner Note that the analog signals 60A, 60B, 60C are not present in the mixed manner Therefore, in the time division multiplex signal, a part of the analog signal 60A is continuous with a part of the analog signal 60B, a part of the analog signal 60B is continuous with a part of the analog signal 60C, and a part of the analog signal 60C is continuous with a part of the analog signal 60A. In other words, in the time division multiplex signal, the part of the analog signal 60C and any analog signal of any other waveform are absent between the part of the analog signal 60A and the part of the analog signal 60B. Further, in the time division multiplex signal, the part of the analog signal 60A and any analog signal of any other waveform are absent between the part of the analog signal 60B and the part of the analog signal 60C. Further, in the time division multiplex signal, the part of the analog signal 60B and any analog signal of any other waveform are absent between the part of the analog signal 60C and the part of the analog signal 60A.

A combined signal, which is obtained by combining the analog signals 60A to 60C, is outputted from the second switch control unit 56. The combined signal is the signal which is the same as or equivalent to the analog signal depicted in FIG. 5. The combined signal is amplified by the amplifier 53, and the amplifier 53 outputs a time division multiplex signal. The time division multiplex signal is the signal which is the same as or equivalent to the time division multiplex signal depicted in FIG. 5. The time division multiplex signal is inputted into the switch group 54. The switch control of the switch group 54 and the driving of the actuator 88 are performed in the same manner as the first embodiment.

In the printing apparatus 1 according to the second embodiment, the data value of the driving waveform data Da is read from the memory 55, and the data value is inputted into the first D/A converter 52*a* to generate the analog signal 60A. Further, the data value of the driving waveform data Db is read from the memory 55, and the data value is inputted into the second D/A converter 52*b* to generate the analog signal 60B. Further, the data value of the driving waveform data Dc is read from the memory 55, and the data value is inputted into the third D/A converter 52*c* to generate the analog signal 60C. The first switch 56*a* is opened/closed on the basis of the first time division signal S3*a* which indicates the opening/closing timing, the second switch 56*b* is opened/closed on the basis of the second time division signal S3*b* which indicates the opening/closing timing different from that of the first time division signal S3*a*, and the third switch 56*c* is opened/closed on the basis of the third time division signal S3*c* which indicates the opening/closing timing different from those of the first and second time division signals S3*a*, S3*b*. Thus, it is possible to generate the time division multiplex signal from each of the analog signals 60A to 60C.

Figure 11:
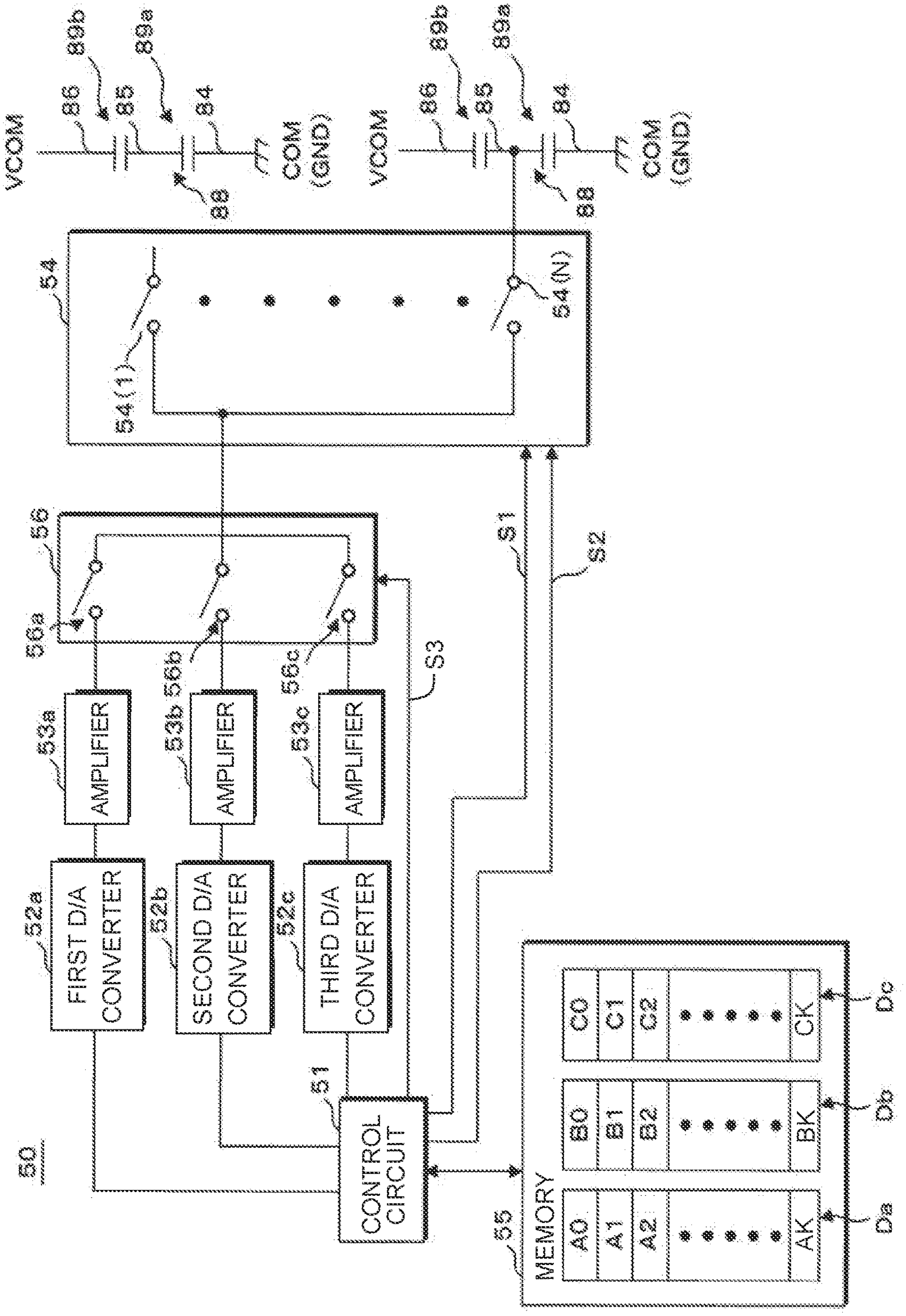
FIG. 11 is a block diagram of a controller.

The printing apparatus 1 according to the second embodiment may be modified to have the following configuration. FIG. 11 is a block diagram of a controller 50 according to a modified embodiment. In the modified embodiment, three amplifiers 53*a* to 53*c* are provided in place of the amplifier 53. Further, the analog signal of the first D/A converter 52*a* is inputted into the amplifier 53*a*, and the amplifier 53*a* outputs the analog signal to the first switch 56*a*. The analog signal of the second D/A converter 52*b* is inputted into the amplifier 53*b*, and the amplifier 53*b* outputs the analog signal to the second switch 56*b*. The analog signal of the third D/A converter 52*c* is inputted into the amplifier 53*c*, and the amplifier 53*c* outputs the analog signal to the third switch 56*c*. The first to third switches 56*a* to 56*c* are opened/closed on the basis of the first to third time division signals S3*a* to S3*c*, and the time division multiplex signal is generated. In other words, in the time division multiplex signal, a part of the analog signal 60A outputted from the amplifier 53*a* is continuous with a part of the analog signal 60B outputted from the amplifier 53*b*, a part of the analog signal 60B outputted from the amplifier 53*b* is continuous with a part of the analog signal 60C outputted from the amplifier 53*c*, and a part of the analog signal 60C outputted from the amplifier 53*c* is continuous with a part of the analog signal 60A outputted from the amplifier 53*a*. That is, in the time division multiplex signal, the part of the analog signal 60C outputted from the amplifier 53*c* and any analog signal of any other waveform are absent between the part of the analog signal 60A outputted from the amplifier 53*a* and the part of the analog signal 60B outputted from the amplifier 53*b*. Further, in the time division multiplex signal, the part of the analog signal 60A outputted from the amplifier 53*a* and any analog signal of any other waveform are absent between the part of the analog signal 60B outputted from the amplifier 53*b* and the part of the analog signal 60C outputted from the amplifier 53*c*. Further, in the time division multiplex signal, the part of the analog signal 60B outputted from the amplifier 53*b* and any analog signal of any other waveform are absent between the part of the analog signal 60C outputted from the amplifier 53*c* and the part of the analog signal 60A outputted from the amplifier 53*a*. The bands of the respective amplifiers can be narrowed by using the three amplifiers. It is easy to realize the time division multiplexing.

Third Embodiment

Figure 12:
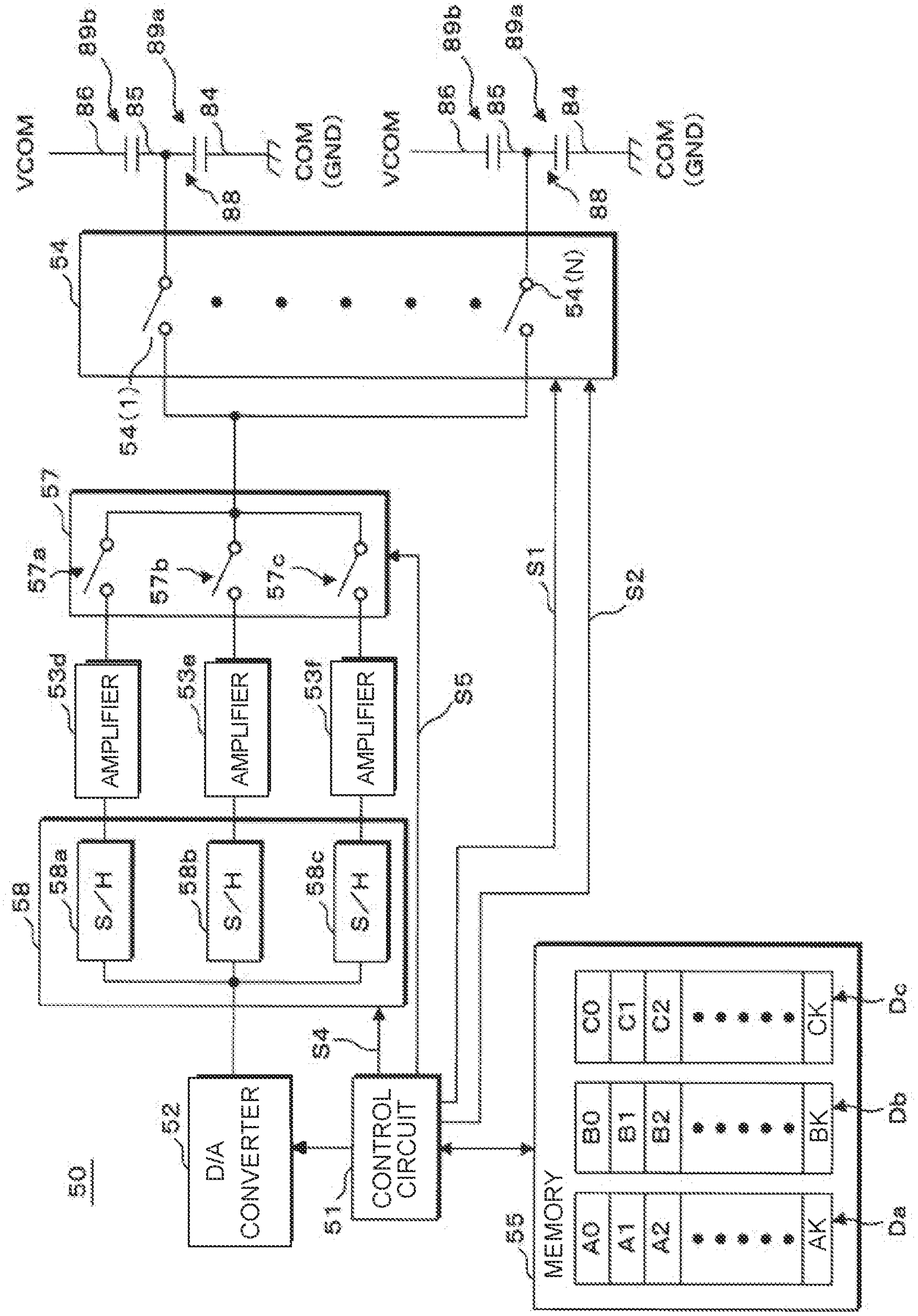
FIG. 12 is a block diagram of a controller.

The present invention will be explained below on the basis of the drawing which depicts a printing apparatus 1 according to a third embodiment. Constitutive components according to the third embodiment, which are the same as or equivalent to the constitutive components according to the first or second embodiment, are designated by the same reference numerals as those of the first and/or second embodiment(s), any detailed explanation of which will be omitted. FIG. 12 is a block diagram of a controller 50.

The controller 50 is provided with, for example, a control circuit 51, a D/A converter 52, three amplifiers 53*d* to 53*f*, a switch group 54, a memory 55, a third switch control unit 57, and a sample hold unit 58 (S/H unit). The third switch control unit 57 is provided with a first switch 57*a*, a second switch 57*b*, and a third switch 57*c*. The sample hold unit 58 is provided with a first sample hold circuit 58*a* (first S/H circuit), a second sample hold circuit 58*b* (second S/H circuit), and a third sample hold circuit 58*c* (third S/H circuit).

The control circuit 51 outputs the time series data to the D/A converter 52. The D/A converter 52 converts the time series data into the analog signal which is outputted to the sample hold unit 58. The analog signal, which is outputted by the D/A converter 52, is the same as or equivalent to the analog signal depicted in FIG. 5.

The control circuit 51 outputs, to the sample hold unit 58, the sampling signals S4*a* to S4*c* which indicate the sampling cycles. The sampling signal S4*a* is inputted into the first sample hold circuit 58*a*, the sampling signal S4*b* is inputted into the second sample hold circuit 58*b*, and the sampling signal S4*c* is inputted into the third sample hold circuit 58*c*. The sampling cycles of the respective sampling signals S4*a* to S4*c* are different from each other, which are deviated from each other by the time interval Δt. Note that the three sampling signals S4*a*, S4*b*, S4*c* are simply referred to as "sampling signal S4" as well (see FIG. 12).

The first sample hold circuit 58*a* samples and holds the analog signal at the sampling cycle of the sampling signal S4*a*, and the signal is outputted to the amplifier 53*d*. The second sample hold circuit 58*b* samples and holds the analog signal at the sampling cycle of the sampling signal S4*b*, and the signal is outputted to the amplifier 53*e*. The third sample hold circuit 58*c* samples and holds the analog signal at the sampling cycle of the sampling signal S4*c*, and the signal is outputted to the amplifier 53*f*.

The analog signal, which is outputted by the first sample hold circuit 58*a*, is the same as or equivalent to the analog signal 60A depicted in FIG. 10. The analog signal, which is outputted by the second sample hold circuit 58*b*, is the same as or equivalent to the analog signal 60B depicted in FIG. 10. The analog signal, which is outputted by the third sample hold circuit 58*c*, is the same as or equivalent to the analog signal 60C depicted in FIG. 10.

The amplifier 53*d* amplifies the analog signal and outputs the signal to the first switch 57*a*. The amplifier 53*e* amplifies the analog signal and outputs the signal to the second switch 57*b*. The amplifier 53*f* amplifies the analog signal and outputs the signal to the third switch 57*c*.

The control circuit 51 outputs, to the third switch control unit 57, the time division signal S5*a* which corresponds to the analog signal outputted by the amplifier 53*d*, the time division signal S5*b* which corresponds to the analog signal outputted by the amplifier 53*e*, and the time division signal S5*c* which corresponds to the analog signal outputted by the amplifier 53*f*. Note that the three time division signals S5*a*, S5*b*, S5*c* are simply referred to as "time division signal S5" as well (see FIG. 12).

The time division signals S5*a*, S5*b*, S5*c* are the pulse waves which are the same as or equivalent to the time division signals S3*a*, S3*b*, S3*c* depicted in FIG. 10. The time interval Δt is provided between the rising point of time of the pulse of the time division signal S5*a* and the rising point of time of the pulse of the time division signal S5*b*. Further, the time interval Δt is provided between the rising point of time of the pulse of the time division signal S5*b* and the rising point of time of the pulse of the time division signal S5*c*, and the time interval Δt is provided between the rising point of time of the pulse of the time division signal S5*c* and the rising point of time of the pulse of the time division signal S5*a*. The respective time division signals S5*a*, S5*b*, S5*c* correspond to the respective synchronization signals S2*a*, S2*b*, S2*c* described above.

The first switch 57*a* is closed if the pulse of the time division signal S5*a* is in the high level interval, or the first switch 57*a* is opened if the pulse of the time division signal S5*a* is in the low level interval. The second switch 57*b* is closed if the pulse of the time division signal S5*b* is in the high level interval, or the second switch 57*b* is opened if the pulse of the time division signal S5*b* is in the low level interval. The third switch 57*c* is closed if the pulse of the time division signal S5*c* is in the high level interval, or the third switch 57*c* is opened if the pulse of the time division signal S5*c* is in the low level interval. Note that the first switch 57*a*, the second switch 57*b*, and the third switch 57*c* are simultaneously opened in some cases, but they are not simultaneously closed, for the following reason. That is, if the first switch 57*a*, the second switch 57*b*, and the third switch 57*c* are simultaneously closed, the analog signals 60A, 60B, 60C are present in a mixed manner Note that the analog signals 60A, 60B, 60C are not present in the mixed manner Therefore, in the time division multiplex signal, a part of the analog signal 60A outputted from the amplifier 53*d* is continuous with a part of the analog signal 60B outputted from the amplifier 53*e*, a part of the analog signal 60B outputted from the amplifier 53*e* is continuous with a part of the analog signal 60C outputted from the amplifier 53*f*, and a part of the analog signal 60C outputted from the amplifier 53*f* is continuous with a part of the analog signal 60A outputted from the amplifier 53*d*. In other words, in the time division multiplex signal, the part of the analog signal 60C outputted from the amplifier 53*f* and any analog signal of any other waveform are absent between the part of the analog signal 60A outputted from the amplifier 53*d* and the part of the analog signal 60B outputted from the amplifier 53*e*. Further, in the time division multiplex signal, the part of the analog signal 60A outputted from the amplifier 53*d* and any analog signal of any other waveform are absent between the part of the analog signal 60B outputted from the amplifier 53*e* and the part of the analog signal 60C outputted from the amplifier 53*f*. Further, in the time division multiplex signal, the part of the analog signal 60B outputted from the amplifier 53*e* and any analog signal of any other waveform are absent between the part of the analog signal 60C outputted from the amplifier 53*f* and the part of the analog signal 60A outputted from the amplifier 53*d*.

A combined signal, i.e., a time division multiplex signal, which is obtained by combining the analog signals outputted from the amplifiers 53*d* to 53*f*, is outputted from the third switch control unit 57. The time division multiplex signal is the signal which is the same as or equivalent to the time division multiplex signal depicted in FIG. 5. The time division multiplex signal is inputted into the switch group 54. The switch control of the switch group 54 and the driving of the actuator 88 are performed in the same manner as the first embodiment.

Note that the sampling point of time, which is indicated by the sampling signal S4*a*, is earlier than the closing point of time which is indicated by the time division signal S5*a*, the sampling point of time, which is indicated by the sampling signal S4*b*, is earlier than the closing point of time which is indicated by the time division signal S5*b*, and the sampling point of time, which is indicated by the sampling signal S4*c*, is earlier than the closing point of time which is indicated by the time division signal S5*c*.

In the printing apparatus 1 according to the third embodiment, the data values of the respective driving waveform data Da, Db, Dc are read from the memory 55, and the data are inputted into the D/A converter 52 while being aligned in time series. The first sample hold circuit 58*a* is operated on the basis of the first sampling signal S4*a*, the second sample hold circuit 58*b* is operated on the basis of the second sampling signal S4*b*, and the third sample hold circuit 58*c* is operated on the basis of the third sampling signal S4*c*. The first to third switches 57*a* to 57*c* can be opened/closed on the basis of the time division signals S5*a* to S5*c* to generate the time division multiplex signal.

Further, the sampling point of time, which is indicated by the sampling signal S4*a*, is earlier than the closing point of time which is indicated by the time division signal S5*a*, the sampling point of time, which is indicated by the sampling signal S4*b*, is earlier than the closing point of time which is indicated by the time division signal S5*b*, and the sampling point of time, which is indicated by the sampling signal S4*c*, is earlier than the closing point of time which is indicated by the time division signal S5*c*. Therefore, the influence exerted on the generation of the time division multiplex signal can be suppressed, which would be otherwise caused by the delay of the time division signal S5*a* to S5*c*.

Fourth Embodiment

Figure 13:
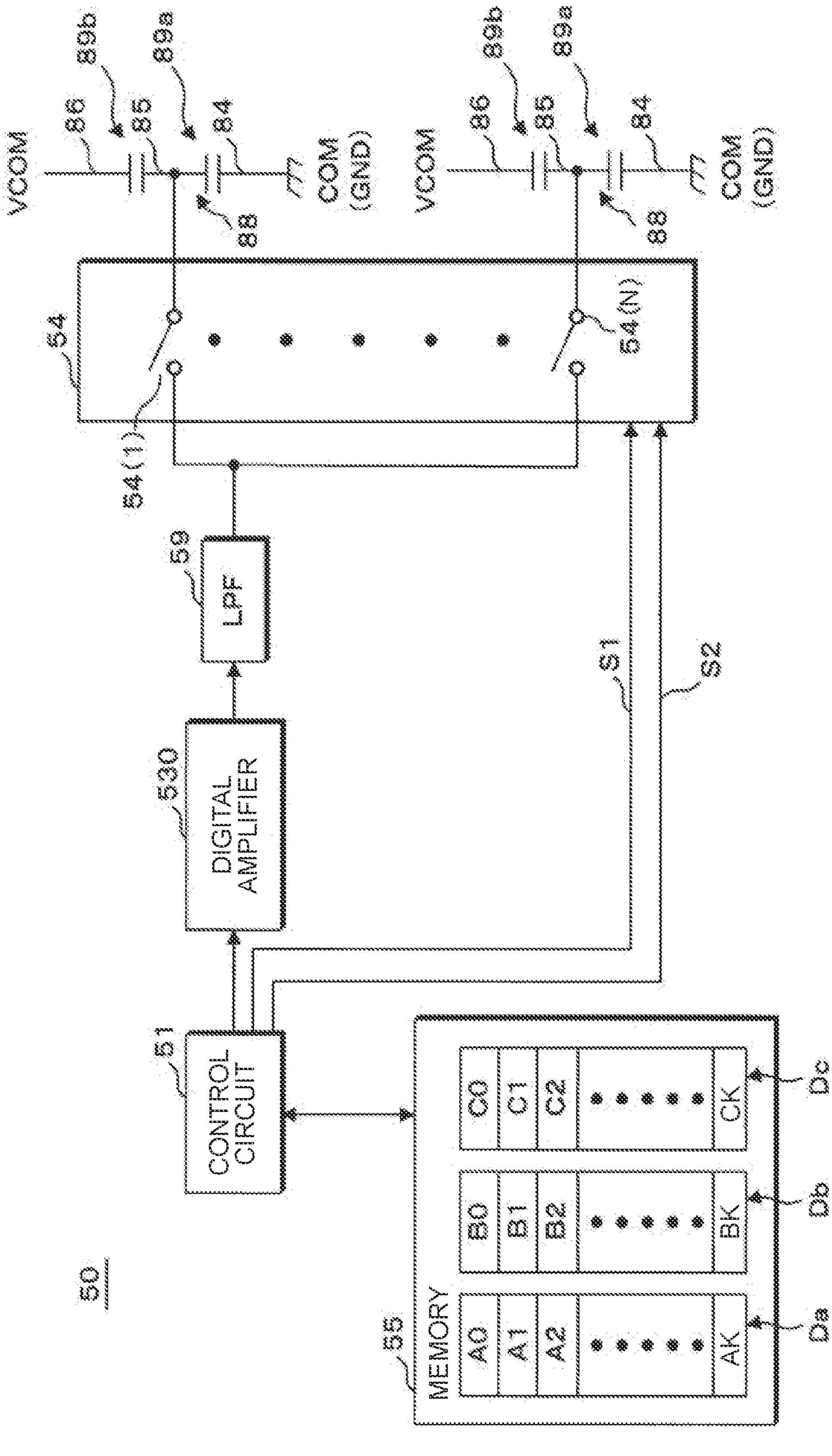
FIG. 13 is a block diagram of a controller.

The present invention will be explained below on the basis of the drawing which depicts a printing apparatus 1 according to a fourth embodiment. Constitutive components according to the fourth embodiment, which are the same as or equivalent to the constitutive components according to the first to third embodiments, are designated by the same reference numerals as those of the first to third embodiments, any detailed explanation of which will be omitted. FIG. 13 is a block diagram of a controller 50.

The controller 50 is provided with a control circuit 51, a digital amplifier 530 into which the digital data can be directly inputted, a low pass filter 59 (LPF), a switch group 54, and a memory 55. The digital amplifier 530 is provided with a switching circuit and an amplifying circuit. The control circuit 51 outputs the time series data (digital data) to the digital amplifier 530. The digital amplifier 530 amplifies the time series data and the amplified data is outputted to the low pass filter 59. In other words, in the time division multiplex signal, the quantized data A0 is continuous with the quantized data B0, the quantized data B0 is continuous with the quantized data C0, and the quantized data C0 is continuous with the quantized data A1. That is, in the time division multiplex signal, the quantized data C0, any other quantized data, and any data of any other waveform are absent between the quantized data A0 and the quantized data B0. Further, in the time division multiplex signal, the quantized data A0, any other quantized data, and any data of any other waveform are absent between the quantized data B0 and the quantized data C0. Further, in the time division multiplex signal, the quantized data B0, any other quantized data, and any data of any other waveform are absent between the quantized data C0 and the quantized data A0. The low pass filter 59 converts the pulse wave outputted by the digital amplifier 530 into an analog signal, and the time division multiplex signal, which is configured by the analog signal, is outputted to the switch group 54. The switch control of the switch group 54 and the driving of the actuator 88 are the same as or equivalent to those of the first embodiment. Note that the output of the digital amplifier 530 has the pulse-shaped form, which is not the continuous waveform. Therefore, the output of the digital amplifier 530 is not the analog signal. That is, the output of the digital amplifier 530 is the time division multiplex signal configured by the digital signal.

In the printing apparatus according to the fourth embodiment, the data values of the respective driving waveform data Da, Db, Dc are read from the memory 55, and the data values are inputted into the digital amplifier 530. Thus, it is possible to generate the time division multiplex signal. The use of the digital amplifier 530 makes it possible to reduce the D/A converter. Highly accurate and highly stable parts are not required for the digital amplifier 530 as compared with any analog amplifier. Therefore, the digital amplifier 530 is resistant to the environment change such as the temperature change or the like. Further, the digital amplifier 530 has a long service life, because the number of actions and the number of parts are small.

Fifth Embodiment

Figure 14:
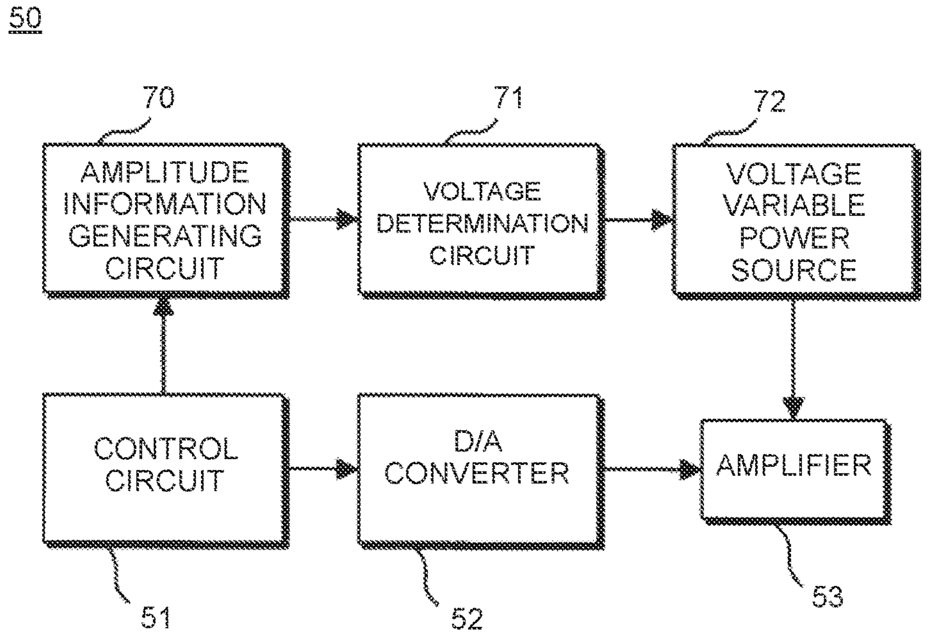
FIG. 14 is a block diagram of a controller.

The present invention will be explained below on the basis of the drawing which depicts a printing apparatus 1 according to a fifth embodiment. Constitutive components according to the fifth embodiment, which are the same as or equivalent to the constitutive components according to the first to fourth embodiments, are designated by the same reference numerals as those of the first to fourth embodiments, any detailed explanation of which will be omitted. FIG. 14 is a block diagram of a controller 50.

The controller 50 is provided with, for example, a control circuit 51, a D/A converter 52, an amplifier 53, an amplitude information generating circuit 70, a voltage determination (decision) circuit 71, and a voltage variable power source 72. The control circuit 51 accesses the memory 55 to acquire the driving waveform data Da to Dc which are outputted to the D/A converter 52. The D/A converter 52 converts the driving waveform data Da to Dc into the analog signals which are outputted to the amplifier 53. The signal control, which is performed for those ranging from the amplifier 53 to the actuator 88, is performed in the same manner as the first to fourth embodiments, any explanation of which will be omitted.

The control circuit 51 outputs the digital signal to the amplitude information generating circuit 70 to generate the information which indicates the amplitude of the digital signal, and the information is outputted to the voltage determination circuit 71. The voltage determination circuit 71 determines the voltage to be set for the amplifier 53 on the basis of the information which indicates the amplitude. The determination is outputted to the voltage variable power source 72. The voltage variable power source 72 supplies the determined voltage to the amplifier 53. Note that the determined voltage is the voltage which is lower than the maximum voltage capable of being supplied by the voltage variable power source 72.

Figure 15:
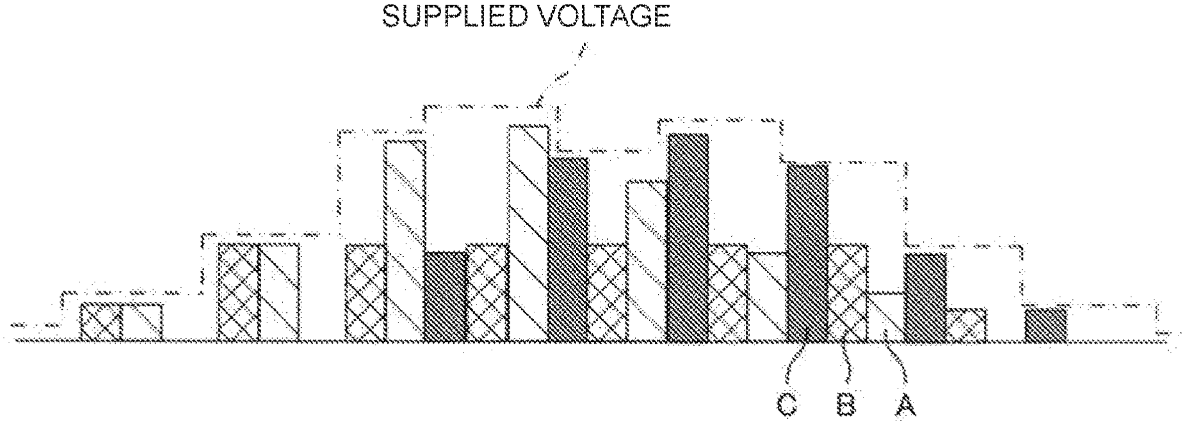
FIG. 15 is an explanatory drawing to explain the relationship between the analog signal outputted from a D/A converter and the voltage supplied to an amplifier.

FIG. 15 is an explanatory drawing to explain the relationship between the analog signal outputted from the D/A converter 52 and the voltage supplied to the amplifier 53. In FIG. 15, the alternate long and short dash line indicates the voltage supplied to the amplifier 53. As depicted in FIG. 15, the voltage, which has the magnitude depending on the amplitude of the analog signal, is supplied to the amplifier 53. It is possible to reduce the electric power consumption amount as compared with a case in which the maximum voltage capable of being supplied by the voltage variable power source 72 is supplied to the amplifier 53.

The printing apparatus 1 described above is based on the serial head system. However, the technique described above may be applied to any printing apparatus based on the line head system. Further, the printing apparatus 1 described above is provided with the ink-jet head based on the piezoelectric system. However, the technique described above may be applied to any printing apparatus provided with an ink-jet head based on the bubble-jet system (the ink heating type ink-jet system) or an ink-jet head based on the electrostatic force system. In particular, when the technique described above is applied to the printing apparatus provided with the head based on the bubble-jet system, then the amplitude is approximately the same and the pulse width differs in relation to the driving waveforms A, B, C, although both of the amplitude and the pulse width differ in the first embodiment. Note that the ink-jet head based on the electrostatic force system is configured, for example, by stacking a first substrate, a second substrate, and a third substrate each of which is composed of a silicon single crystal substrate. The first substrate has a recess for constructing a liquid chamber in which a bottom wall is a vibration plate. The second substrate is joined to the first substrate, which has an electrode having approximately the same shape as that of the vibration plate. The third substrate is joined to the first substrate, which has a part of the liquid chamber, a nozzle, and a flow passage for connecting the liquid chamber and the nozzle. When a positive pulse voltage is applied from an oscillation circuit to the electrode, then the surface of the electrode is electrified to have a plus electric potential, and the corresponding vibration plate is electrified to have a minus electric potential. Then, the vibration plate is warped, and the liquid chamber is expanded. Subsequently, when the application of the pulse voltage to the electrode is turned OFF, then the warped vibration plate is restored, the liquid chamber is shrunk, the pressure in the liquid chamber is raised, and the ink is discharged from the nozzle. The material of the first substrate, the second substrate, and the third substrate is not limited to silicon. The first substrate, the second substrate, and the third substrate may be composed of glass, nickel, plastic, or stainless steel.

In the first embodiment, the resonance frequency of the ink-jet head 8 is either the resonance frequency which is provided when the pressure chamber 81 is not filled with the ink or the resonance frequency which is provided when the pressure chamber 81 is filled with the ink. However, there is no limitation thereto. The resonance frequency of the ink-jet head 8 may be larger than the resonance frequency which is provided when the pressure chamber 81 is filled with the ink and smaller than the resonance frequency which is provided when the pressure chamber 81 is not filled with the ink.

In the first embodiment, the time series data is provided such that the data Ak, Bk, Ck are successively aligned while providing the time intervals Δt, i.e., the data are aligned in the order of A0, B0, C0, A1, B1, C1, . . . , AK, BK, CK. However, various improvements can be made for the data Ak, Bk, Ck. For example, when the time interval Δt is a time interval Δt' in which the time interval is shorter, the control circuit 51 generates data A'k, B'k, C'k by thinning out parts of the high level interval and the low level interval except for the rising and falling portions of the data Ak, Bk, Ck. In other words, the time length of the data A'k is shorter than the time length of the data Ak. Further, the time length of the data B1 is shorter than the time length of the data Bk. Further, the time length of the data C'k is shorter than the time length of the data Ck. The control circuit 51 may use, as the time series data, the data in which data A'0, B'0, C'0, A'1, B'1, C'1, . . . , A'K, B'K, C'K are aligned in this order.

Further, when the time interval Δt is a time interval Δt" in which the time interval is longer, the control circuit 51 generates data A"k, B"k, C"k by extending the high level interval and the low level interval except for the rising and falling portions of the data Ak, Bk, Ck. In other words, the time length of the data A"k is longer than the time length of the data Ak. Further, the time length of the data B"k is longer than the time length of the data Bk. Further, the time length of the data C"k is longer than the time length of the data Ck. The control circuit 51 may use, as the time series data, the data in which data A"0, B"0, C"0, A"1, B"1, C"1, . . . , A"K, B"K, C"K are aligned in this order.

In the first embodiment, the control circuit 51 accesses the memory 55 to acquire the driving waveform data Da, Db, Dc, and the time series data is prepared. In the time series data, the data Ak, Bk, Ck are successively aligned while providing the time intervals Δt. However, there is no limitation thereto. The control circuit 51 may prepare the time series data by accessing the memory 55, acquiring the driving waveform data Da, Db, Dc, and thinning out parts of the acquired driving waveform data Da, Db, Dc. Specifically, the driving waveform data Da has the quantized data A0, A1, A2, A3, the driving waveform data Db has the quantized data B0, B1, B2, B3, and the driving waveform data Dc has the quantized data C0, C1, C2, C3. However, the data, in which the data are aligned in an order of A0, B0, C0, A2, B2, C2, . . . , AK, BK, CK, may be used as the time series data by using the quantized data A0, A2, B0, B2, C0, C2.

Further, the data, in which the data are aligned in an order of A0, C0, B1, A2, C2, B3, . . . , AK−1, CK−1, BK, may be used as the time series data by using the quantized data A0, A2, B1, B3, C0, C2. Further, the data, in which the data are aligned in an order of B0, A1, C1, B2, A3, C3, . . . , BK−1, AK, CK, may be used as the time series data by using the quantized data A1, A3, B0, B2, C1, C3.

Further, the control circuit 51 may access the memory 55 to acquire the driving waveform data Da, Db, Dc and generate the interpolation data on the basis of the acquired driving waveform data Da, Db, Dc, and the control circuit 51 may prepare the time series data by using the acquired driving waveform data Da, Db, Dc and the interpolation data. Specifically, the driving waveform data Da has quantized data A0, A1, A2, A3, the driving waveform data Db has quantized data B0, B1, B2, B3, and the driving waveform data Dc has quantized data C0, C1, C2, C3. Further, the control circuit 51 generates interpolation data A0.5 on the basis of the quantized data A0, A1, the control circuit 51 generates interpolation data A1.5 on the basis of the quantized data A1, A2, the control circuit 51 generates interpolation data B0.5 on the basis of the quantized data B0, B1, the control circuit 51 generates interpolation data B1.5 on the basis of the quantized data B1, B2, the control circuit 51 generates interpolation data C0.5 on the basis of the quantized data C0, C1, and the control circuit 51 generates interpolation data C1.5 on the basis of the quantized data C1, C2. Then, the control circuit 51 may use, as the time series data, the data in which the data are aligned in an order of the quantized data A0, B0, C0, the interpolation data A0.5, B0.5, C0.5, the quantized data A1, B1, C1, the interpolation data A1.5, B1.5, C1.5, and the quantized data A2, B2, C2, . . . , AK, BK, CK.

Further, the control circuit 51 generates interpolation data A0.25 on the basis of the quantized data A0 and the interpolation data A0.5, the control circuit 51 generates interpolation data A0.75 on the basis of the interpolation data A0.5 and the quantized data A1, the control circuit 51 generates interpolation data B0.25 on the basis of the quantized data B0 and the interpolation data B0.5, the control circuit 51 generates interpolation data B0.75 on the basis of the interpolation data B0.5 and the quantized data B1, the control circuit 51 generates interpolation data C0.25 on the basis of the quantized data C0 and the interpolation data C0.5, and the control circuit 51 generates interpolation data C0.75 on the basis of the interpolation data C0.5 and the quantized data C1. Then, the control circuit 51 may use, as the time series data, the data in which the data are aligned in an order of the quantized data A0, B0, C0, the interpolation data A0.25, B0.25, C0.25, the interpolation data A0.5, B0.5, C0.5, the interpolation data A0.75, B0.75, C0.75, and the quantized data A1, B1, C1, . . . , AK, BK, CK. Note that the memory 55 may previously store the interpolation data A0.5, A1.5, B0.5, B1.5, C0.5, C1.5. Further, the memory 55 may previously store the interpolation data A0.25, A0.75, B0.25, B0.75, C0.25, C0.75.

In the first embodiment, the driving waveform A is the waveform which is provided in order to discharge the large droplet, the driving waveform B is the waveform which is provided in order to discharge the middle droplet, and the driving waveform C is the waveform which is provided in order to discharge the large droplet. However, there is no limitation thereto. The driving waveform C may be a waveform which is provided in order to discharge the small droplet. Further, a driving waveform D may be present. The driving waveform D is the waveform which is provided in order to discharge the ink droplet larger than the large droplet. In other words, the number of the types of the driving waveforms is not limited to three, which may be four or two. If the four types of driving waveforms are used, the time division multiplex signal maintains the state in which the four types of driving waveforms are mixed throughout one printing job. Thus, the time division multiplex signal for one printing task is configured by the four types of analog signals only For one cycle until the time division multiplex signal falls after the time division multiplex signal rises in one discharge driving cycle, the time division multiplex signal is also configured by the four types of analog signals only. Further, if the two types of driving waveforms are used, the time division multiplex signal maintains the state in which the two types of driving waveforms are mixed throughout one printing job. Thus, the time division multiplex signal for one printing task is configured by the two types of analog signals. For one cycle until the time division multiplex signal falls after the time division multiplex signal rises in one discharge driving cycle, the time division multiplex signal is also configured by the two types of analog signals only.

In the first embodiment, the driving waveforms A, B, C are used for the way of use of the printing. However, there is no limitation thereto. The driving waveforms A, B, C may be used for the way of use of the flashing process (S7). In other words, the time division multiplex signal includes three types of driving waveforms for discharge the inks via the nozzles 80 in order to perform the flashing process (S7). After that, the driving waveform signal Pa, the driving waveform signal Pb, and the driving waveform signal Pc are separated from the time division multiplex signal in accordance with the predetermined sampling frequency. Subsequently, the actuator 88 is driven by any one of the driving waveform signal Pa, the driving waveform signal Pb, and the driving waveform signal Pc. The printing apparatus 1 can discharge the inks in order to perform the three kinds of flashing processes (S7) by using only one type of the time division multiplex signal. In this case, the discharge of the inks, which is performed for the three kinds of flashing processes (S7), includes a first flashing process in which the number of emitting ink droplets is a predetermined number, a second flashing process in which the number of emitting ink droplets is larger than that of the first flashing process, and a third flashing process in which the number of emitting ink droplets is larger than that of the second flashing process. Note that the number of emitting ink droplets may be the same and the size of the ink droplets may be different for the ink discharge to be performed for the three kinds of the flashing processes (S7). The size of the ink droplets in the second flashing process is larger than that in the first flashing process. Further, the size of the ink droplets in the third flashing process is larger than that in the second flashing process.

In the first embodiment, the driving waveforms A, B, C are the waveforms which are provided in order that the piezoelectric member 83 is deformed, the vibration plate 82 is vibrated, and the ink, which is present in the pressure chamber 81, is discharged via the nozzle 80 after allowing the ink to pass through the descender in accordance with the vibration of the vibration plate 82. However, there is no limitation thereto. For example, the following configuration is also available. That is, the driving waveforms A, B are the waveforms which are provided in order that the ink, which is present in the pressure chamber 81, is discharged via the nozzle 80 after allowing the ink to pass through the descender. However, the driving waveform C is the waveform which is provided in order that the piezoelectric member 83 is deformed and the vibration plate 82 is vibrated, but the driving waveform C is not the waveform which is provided in order that the ink, which is present in the pressure chamber 81, is discharged via the nozzle 80 after allowing the ink to pass through the descender. In other words, the driving waveform C is the waveform which is provided in order to perform the undischarge flashing process. In particular, the piezoelectric member 83 is slightly deformed. Then, the surface (meniscus) of the ink swings without discharging the ink. Therefore, the time division multiplex signal includes the two types of driving waveforms for discharging the ink via the nozzle 80 and the one type of driving waveform for swinging the surface (meniscus) of the ink without discharging the ink. After that, the driving waveform signal Pa, the driving waveform signal Pb, and the driving waveform signal Pc are separated from the time division multiplex signal by using a predetermined sampling frequency. Subsequently, the actuator 88 is driven by any one of the driving waveform signal Pa, the driving waveform signal Pb, and the driving waveform signal Pc. The printing apparatus 1 can perform the two kinds of ink discharging and the one kind of ink surface (meniscus) swinging by using, for example, only the one type of time division multiplex signal. Further, for example, the printing apparatus 1 can perform two kinds of ink discharging for the flashing processes (S7) and one kind of ink surface (meniscus) swinging for the undischarge flashing process (S10) by using only one type of time division multiplex signal. In this case, the two kinds of ink discharging for the flashing processes (S7) include a first flashing process in which the number of emitting ink droplets is a predetermined number, and a second flashing process in which the number of emitting ink droplets is larger than that in the first flashing process. Note that in the two kinds of ink discharge for the flashing processes (S7), the number of emitting ink droplets may be the same and the sizes of ink droplets may be different from each other. In the second flashing process, the size of ink droplets is larger than that in the first flashing process.

Further, for example, the driving waveform A is the waveform which is provided in order that the ink, which is present in the pressure chamber 81, is discharged via the nozzle 80 after allowing the ink to pass through the descender. However, the driving waveforms B, C are the waveforms which are provided in order to perform the undischarge flashing process. In particular, the piezoelectric member 83 is slightly deformed. Then, the surface (meniscus) of the ink swings without discharging the ink. Therefore, the time division multiplex signal includes the one types of driving waveform for discharging the ink via the nozzle 80 and the two type of driving waveforms for swinging the surface (meniscus) of the ink without discharging the ink. After that, the driving waveform signal Pa, the driving waveform signal Pb, and the driving waveform signal Pc are separated from the time division multiplex signal by using a predetermined sampling frequency. The actuator 88 is driven by any one of the driving waveform signal Pa, the driving waveform signal Pb, and the driving waveform signal Pc. The printing apparatus 1 can perform the one kind of ink discharge and the two kinds of ink surface (meniscus) swinging by using only the one type of time division multiplex signal. For example, the printing apparatus 1 can perform the one kind of ink discharge, the ink surface (meniscus) swinging in order to suppress the increase in viscosity of the ink in the vicinity of the nozzle, and the ink surface (meniscus) swinging in order to maintain a constant temperature of the ink in the vicinity of the nozzle by using only one type of time division multiplex signal. Further, for example, the printing apparatus 1 can perform one kind of ink discharge for the flashing process (S7) and two kinds of ink surface (meniscus) swinging for the undischarge flashing processes (S10) by using only one type of time division multiplex signal. In this case, the two kinds of ink surface (meniscus) swinging for the undischarge flashing processes (S10) include a first undischarge flashing process in which the number of times of the surface (meniscus) swinging is a predetermined number of times, and a second undischarge flashing process in which the number of times of the surface (meniscus) swinging is larger than that in the first undischarge flashing process. Note that in the two kinds of ink surface (meniscus) swinging for the undischarge flashing processes (S10), the number of times of surface (meniscus) swinging may be the same, and the intensities of the surface (meniscus) swinging may be different from each other. In the second undischarge flashing process, the intensity of the surface (meniscus) swinging is stronger than that in the first undischarge flashing process.

Further, for example, the driving waveforms A, B, C are the waveforms which are provided in order to perform the undischarge flashing process. In particular, the piezoelectric member 83 is slightly deformed. Then, the surface (meniscus) of the ink swings without discharging the ink. Therefore, the time division multiplex signal includes the three type of driving waveforms for swinging the surface (meniscus) of the ink without discharging the ink. After that, the driving waveform signal Pa, the driving waveform signal Pb, and the driving waveform signal Pc are separated from the time division multiplex signal by using a predetermined sampling frequency. The actuator 88 is driven by any one of the driving waveform signal Pa, the driving waveform signal Pb, and the driving waveform signal Pc. That is, the printing apparatus 1 can perform the three kinds of ink surface (meniscus) swinging. For example, the printing apparatus 1 can perform the ink surface (meniscus) swinging in order to suppress the slight increase in viscosity of the ink in the vicinity of the nozzle, the ink surface (meniscus) swinging to a greater extent in order to suppress the severe increase in viscosity of the ink in the vicinity of the nozzle, and the ink surface (meniscus) swinging in order to maintain a constant temperature of the ink in the vicinity of the nozzle by using the one type of time division multiplex signal.

It is to be understood that the embodiments disclosed herein are exemplary in every point and the embodiments are not restrictive. The technical features described in the respective embodiments can be combined with each other. It is intended that the scope of the present invention includes all modifications or alterations included in claims and all ranges equivalent to claims.

What is claimed is:

1. A head comprising:

a nozzle configured to discharge a liquid by an energy generating element;

a signal generator configured to generate, based on at least a first data representing a first driving waveform and a second data representing a second driving waveform different from the first driving waveform, a time division multiplex signal including a first portion being a part of the first driving waveform, a second portion being another part of the first driving waveform, a third portion being a part of the second driving waveform and a fourth portion being another part of the second driving waveform waveform; and a separator configured to separate a first driving waveform signal representing the first driving waveform or a second driving waveform signal representing the second driving waveform from the time division multiplex signal generated by the signal generator, the first driving waveform signal including only a part representing the first driving waveform and not including a part other than the part representing the first driving waveform, the second driving waveform signal including only a part representing the second driving waveform and not including a part other than the part representing the second driving waveform, wherein:

the energy generating element is configured to be driven by the first driving waveform signal or the second driving waveform signal separated by the separator;

in the time division multiplex signal, the third portion being the part of the second driving waveform is-aligned between the first portion being the part of the first driving waveform and the second portion being the other part of the first driving waveform, and the second portion being the other part of the first driving waveform is-aligned between the third portion being the part of the second driving waveform and the fourth portion being the other part of the second driving waveform; and the time division multiplex signal is capable of transmitting the first data and the second data via a single signal line.

2. The head according to claim 1, wherein:

the first data has a plurality of quantized data values and the second data has a plurality of quantized data values;

the signal generator includes a control circuit and a memory; and the control circuit is configured to read the plurality of quantized data values of the first data and the plurality of quantized data values of the second data from the memory memory, and transmit the plurality of quantized data values of the first data and the plurality of quantized data values of the second data while aligning the plurality of quantized data values of the first data and the plurality of quantized data values of the second data in time series to generate the time division multiplex signal.

3. The head according to claim 2, wherein the signal generator includes:

a digital-analog converter configured to convert the plurality of quantized data values of the first data and the plurality of quantized data values of the second data into an analog signal; and an amplifier configured to amplify the analog signal of the digital-analog converter, wherein:

the control circuit is configured to input the plurality of quantized data values of the first data and the plurality of quantized data values of the second data into the digital-analog converter.

4. The head according to claim 2, wherein:

the signal generator includes a digital amplifier into which digital data can be directly inputted; and the control circuit is configured to output the plurality of quantized data values of the first data and the plurality of quantized data values of the second data to the digital amplifier.

5. The head according to claim 1, wherein:

the first data has a plurality of quantized data values and the second data has a plurality of quantized data values;

the signal generator includes:

a control circuit;

a memory;

a first digital-analog converter configured to convert the plurality of quantized data values of the first data into an analog signal;

a first switch configured such that the analog signal from the first digital-analog converter is inputted into the first switch;

a second digital-analog converter configured to convert the plurality of quantized data values of the second data into an analog signal; and a second switch configured such that the analog signal from the second digital-analog converter is inputted into the second switch; and the control circuit is configured to generate the time division multiplex signal by:

reading the plurality of quantized data values of the first data from the memory and inputting the plurality of quantized data values of the first data into the first digital-analog converter;

reading the plurality of quantized data values of the second data from the memory and inputting the plurality of quantized data values of the second data into the second digital-analog converter;

opening and closing the first switch based on a first time division signal indicating opening-closing timing; and opening and closing the second switch based on a second time division signal indicating opening-closing timing different from the opening-closing timing indicated by the first time division signal.

6. The head according to claim 1, wherein:

the first data has a plurality of quantized data values and the second data has a plurality of quantized data values;

the signal generator includes:

a control circuit;

a memory;

a digital-analog converter configured to convert the plurality of quantized data values of the first data and the plurality of quantized data values of the second data into an analog signal;

a first sample hold circuit and a second sample hold circuit each configured to sample and hold the analog signal of the digital-analog converter;

a first amplifier configured to amplify the analog signal of the first sample hold circuit;

a second amplifier configured to amplify the analog signal of the second sample hold circuit;

a first switch configured such that the analog signal of the first amplifier is inputted into the first switch; and a second switch configured such that the analog signal of the second amplifier is inputted into the second switch; and the control circuit is configured to generate the time division multiplex signal by:

reading the plurality of quantized data values of the first data and the plurality of quantized data values of the second data from the memory and inputting the plurality of quantized data values of the first data and the plurality of quantized data values of the second data into the digital-analog converter while aligning the plurality of quantized data values of the first data and the plurality of quantized data values of the second data in time series;

operating the first sample hold circuit based on a first sampling signal indicating a sampling cycle;

operating the second sample hold circuit based on a second sampling signal indicating a sampling cycle different from the sampling cycle indicated by the first sampling signal;

opening and closing the first switch based on a first time division signal indicating an opening point of time and a closing point of time of the first switch; and opening and closing the second switch based on a second time division signal indicating an opening point of time and a closing point of time of the second switch different from the opening point of time and the closing point of time of the first switch indicated by the first time division signal.

7. The head according to claim 6, wherein a sampling point of time indicated by the first sampling signal is earlier than the closing point of time indicated by the first time division signal, and a sampling point of time indicated by the second sampling signal is earlier than the closing point of time indicated by the second time division signal.

8. The head according to claim 1, wherein:

the separator includes a switch configured such that the time division multiplex signal is inputted into the switch;

a switch control signal for opening and closing the switch and a synchronization signal indicating an opening-closing timing are inputted into the switch; and the switch is configured to be opened and closed based on the switch control signal and the synchronization signal to separate the first driving waveform signal or the second driving waveform signal from the time division multiplex signal.

9. The head according to claim 8, further comprising:

a switch control circuit, wherein:

the switch control circuit is configured to open and close the switch based on the switch control signal and the synchronization signal.

10. The head according to claim 1, wherein:

the first data has a plurality of quantized data values and the second data has a plurality of quantized data values;

the signal generator includes:

an amplifier configured to amplify the time division multiplex signal;

an amplitude information generating circuit configured to generate amplitude information of the time division multiplex signal;

a voltage variable power source configured to supply a voltage to the amplifier; and a determination circuit configured to determine a voltage which has a voltage value variable based on the amplitude information generated by the amplitude information generating circuit and which is lower than a maximum voltage capable of being supplied by the voltage variable power source; and the voltage variable power source is configured to supply the voltage determined by the determination circuit to the amplifier.

11. The head according to claim 1, wherein the signal generator is configured to generate, after thinning at least a part of the first portion, the time division multiplex signal in which the third portion is aligned between the first portion and the second portion and the second portion is aligned between the third portion and the fourth portion, the time division multiplex signal being capable of transmitting the first data and the second data via a single signal line.

12. The head according to claim 1, wherein the signal generator is configured to generate, after extending at least the first portion, the time division multiplex signal in which the third portion is aligned between the first portion and the second portion and the second portion is aligned between the third portion and the fourth portion, the time division multiplex signal being capable of transmitting the first data and the second data via a single signal line.

13. A head comprising:

a nozzle configured to discharge a liquid by an energy generating element;

a signal generator configured to generate, based on at least a first data representing a first driving waveform and a second data representing a second driving waveform different from the first driving waveform, a time division multiplex signal including a first portion being a part of the first driving waveform, a second portion being another part of the first driving waveform, a third portion being a part of the second driving waveform and a fourth portion being another part of the second driving waveform; and a separator configured to separate a first driving waveform signal representing the first driving waveform or a second driving waveform signal representing the second driving waveform from the time division multiplex signal generated by the signal generator, wherein:

the energy generating element is configured to be driven by the first driving waveform signal or the second driving waveform signal separated by the separator;

in the time division multiplex signal, the third portion being the part of the second driving waveform aligned between the first portion being the part of the first driving waveform and the second portion being the other part of the first driving waveform, and the second portion being the other part of the first driving waveform aligned between the third portion being the part of the second driving waveform and the fourth portion being the other part of the second driving waveform;

the time division multiplex signal is capable of transmitting the first data and the second data via a single signal line; and the separator is configured to separate the first driving waveform signal or the second driving waveform signal in accordance with a sampling frequency not less than a resonance frequency of the head.

14. The head according to claim 13, further comprising:

a pressure chamber configured to accommodate the liquid, wherein:

the resonance frequency of the head is a resonance frequency provided in a case that the pressure chamber is filled with the liquid.

15. The head according to claim 13, further comprising:

a pressure chamber configured to accommodate the liquid, wherein:

the resonance frequency of the head is a resonance frequency provided in a case that the pressure chamber is not filled with the liquid.

16. A printing apparatus comprising a head and a conveyer, wherein the head includes:

a signal generator configured to generate, based on at least a first data representing a first driving waveform and a second data representing a second driving waveform different from the first driving waveform, a time division multiplex signal including a first portion being a part of the first driving waveform, a second portion being another part of the first driving waveform, a third portion being a part of the second driving waveform and a fourth portion being another part of the second driving waveform;

a separator configured to separate a first driving waveform signal representing the first driving waveform or a second driving waveform signal representing the second driving waveform from the time division multiplex signal generated by the signal generator, the first driving waveform signal including only a part representing the first driving waveform and not including a part other than the part representing the first driving waveform, the second driving waveform signal including only a part representing the second driving waveform and not including a part other than the part representing the second driving waveform;

an energy generating element configured to be driven by the first driving waveform signal or the second driving waveform signal separated by the separator; and a nozzle configured to discharge a liquid by driving of the energy generating element;

the conveyer is configured to convey a printing medium subjected to printing with the liquid discharged from the nozzle;

in the time division multiplex signal, the third portion being the part of the second driving waveform is-aligned between the first portion being the part of the first driving waveform and the second portion being the other part of the first driving waveform, and the second portion being the other part of the first driving waveform is-aligned between the third portion being the part of the second driving waveform and the fourth portion being the other part of the second driving waveform; and the time division multiplex signal is capable of transmitting the first data and the second data via a single signal line.

17. A head controller for a head including a nozzle configured to discharge a liquid by an energy generating element, and a separator, the head controller comprising a signal generator configured to generate, based on at least a first data representing a first driving waveform and a second data representing a second driving waveform different from the first driving waveform, a time division multiplex signal including a first portion being a part of the first driving waveform, a second portion being another part of the first driving waveform, a third portion being a part of the second driving waveform and a fourth portion being another part of the second driving waveform, wherein:

the separator is configured to separate a first driving waveform signal representing the first driving waveform or a second driving waveform signal representing the second driving waveform from the time division multiplex signal generated by the signal generator, the first driving waveform signal including only a part representing the first driving waveform and not including a part other than the part representing the first driving waveform, the second driving waveform signal including only a part representing the second driving waveform and not including a part other than the part representing the second driving waveform;

the energy generating element is configured to be driven by the first driving waveform signal or the second driving waveform signal separated by the separator;

in the time division multiplex signal, the third portion being the part of the second driving waveform aligned between the first portion being the part of the first driving waveform and the second portion being the other part of the first driving waveform, and the second portion being the other part of the first driving waveform is-aligned between the third portion being the part of the second driving waveform and the fourth portion being the other part of the second driving waveform; and the time division multiplex signal is capable of transmitting the first data and the second data via a single signal line.

* * * * *